United States Patent
Whitehouse et al.

[11] Patent Number: 6,040,575
[45] Date of Patent: Mar. 21, 2000

[54] MASS SPECTROMETRY FROM SURFACES

[75] Inventors: Craig M. Whitehouse; Bruce A. Andrien, Jr., both of Branford, Conn.

[73] Assignee: Analytica of Branford, Inc., Branford, Conn.

[21] Appl. No.: 09/235,945

[22] Filed: Jan. 22, 1999

Related U.S. Application Data

[60] Provisional application No. 60/072,246, Jan. 23, 1998.
[51] Int. Cl.[7] .................................................. H01J 49/16
[52] U.S. Cl. ........................... 250/288; 250/287; 250/282
[58] Field of Search .................................. 250/287, 288, 250/282

[56] References Cited

U.S. PATENT DOCUMENTS

| | | | |
|---|---|---|---|
| 4,851,669 | 7/1989 | Aberth | 250/281 |
| 4,978,852 | 12/1990 | Williams et al. | 250/282 |
| 5,144,127 | 9/1992 | Williams et al. | 250/287 |
| 5,233,189 | 8/1993 | Wollnik | 250/287 |
| 5,521,382 | 5/1996 | Tanaka et al. | 250/292 |
| 5,569,917 | 10/1996 | Buttrill et al. | 250/292 |
| 5,689,111 | 11/1997 | Dresch et al. | 250/287 |

*Primary Examiner*—Jack Berman
*Attorney, Agent, or Firm*—Levisohn, Lerner, Berger & Langsam

[57] ABSTRACT

A Time-Of-Flight mass spectrometer is configured with a pulsing region and electronic controls to cause the directing of ions to a surface in the Time-Of-Flight pulsing region. The population of ions resulting from the collecting of said ions on or near said surface is subsequently accelerated into the Time-Of-Flight tube for mass to charge analysis. Ions produced away from said surface located in the pulsing region of a Time-Of-Flight mass spectrometer can be directed to the surface with high or low surface collisional energies. Higher energy ion collisions with the surface can result in Surface Induced Dissociation fragmentation and the resulting ion fragment population can be accelerated into Time-Of-Flight tube where the ions are mass to charge analyzed. Ion mass to charge selection can occur prior to directing ions to the pulsing region surface allowing MS/MS Time-Of-Flight mass analysis with SID. Ion to surface low energy collisions or soft landings resulting in little or no ion fragmentation provide a means for spatially focusing ions on or near the surface prior to accelerating the surface collected ions into the Time-Of-Flight tube. The apparatus and methods described in the invention result in refined control of ion fragmentation energy and improved Time-Of-Flight mass to charge analysis performance.

1 Claim, 12 Drawing Sheets

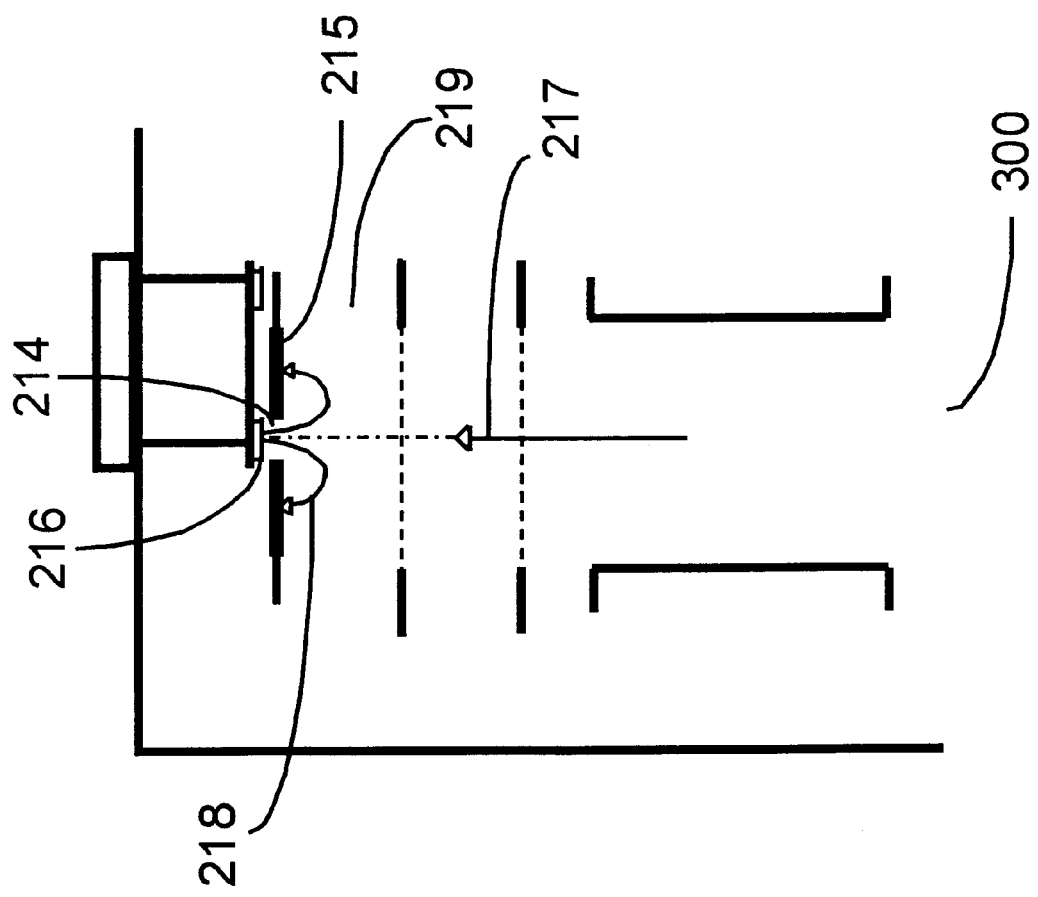

MASS SPECTROMETRY FROM SURFACES

RELATED APPLICATIONS

This application claims the benefit of and all rights of priority to U.S. Provisional Application Serial No. 60/072, 246, filed Jan. 23, 1998, the disclosure of which is hereby incorporated herein by reference.

FIELD OF THE INVENTION

The present invention relates to the field of mass spectrometry and in particular to apparatus and methods for ion-surface interactions within mass analyzers.

BACKGROUND OF THE INVENTION

Mass spectrometers are used to analyze sample substances containing elements or compounds or mixtures of elements or compounds) by measuring the mass to charge of ions produced from a sample substance in an ion source. A number of types of ion sources that can produce ions from solid, liquid or gaseous sample substrates have been combined with mass spectrometers. Ions can be produced in vacuum using ion sources, including, but not limited to, Electron Ionization (EI), Chemical Ionization (CI), Laser Desorption (LD), Matrix Assisted Laser Desorption (MALDI), Fast Atom Bombardment (FAB), Field Desorption (FD) or Secondary Ion Mass Spectrometry (SIMS). Alternatively, ions can be produced at or near atmospheric pressure using ion sources, including, but not limited to, Electrospray (ES), Atmospheric Pressure Chemical Ionization (APCI) or Inductively Coupled Plasma (ICP). Ion sources that operate at intermediate vacuum pressures such as Glow Discharge Ion Sources have also been used to generate ions for mass spectrometric analysis. Ion sources that operate in vacuum are generally located in the vacuum region of the mass spectrometer near the entrance to the mass analyzer to improve the efficiency of ion transfer to the detector. Ion sources that produce ions in vacuum have also been located outside the region near the mass spectrometer entrance. The ions produced in a location removed from the mass analyzer entrance must be delivered to the entrance region of the mass spectrometer prior to mass analysis. Atmospheric or intermediate pressure ion sources are configured to deliver ions produced at higher pressure into the vacuum region of the mass analyzer. The geometry and performance of the ion optics used to transport ions from an ion source into the entrance region of a given mass analyzer type can greatly affect the mass analyzer performance. This is particularly the case with Time-Of-Flight mass analyzers, in which the initial spatial and energy distribution of the ions pulsed into the flight tube of a Time-Of-Flight mass analyzer affects the resulting mass to charge analysis resolution and mass accuracy.

Mass analysis conducted in a Time-Of-Flight mass (TOF) spectrometer is achieved by accelerating or pulsing a group of ions into a flight tube under vacuum conditions. During the flight time, ions of different mass to charge values spatially separate prior to impacting on a detector surface. Ions are accelerated from a first acceleration or pulsing region and may be subject to one or more acceleration and deceleration regions during the ion flight time prior to impinging on a detector surface. Multiple ion accelerating and decelerating stages configured in Time-Of-Flight mass spectrometers aid in compensating or correcting for the initial ion spatial and energy dispersion of the initial ion population in the first ion pulsing or accelerating region. The most common lens geometry used in the first TOF ion pulsing or accelerating region is two parallel planar electrodes with the electrode surfaces oriented perpendicular to the direction of ion acceleration into the Time-Of-Flight tube. The direction of the initial ion acceleration is generally in a direction parallel with the TOF tube axis. A linear uniform electric field is formed in the gap between the two parallel planar electrodes when different electrical potentials are applied to the two electrodes. The planar electrode positioned in the direction of ion acceleration into the TOF tube is generally configured as a highly transparent grid to allow ions to pass through with minimal interference to the ion trajectories. To maximize the performance of a Time-Of-Flight mass analyzer, it is desirable to initiate the acceleration of ions in the pulsing region with all ions initially positioned in a plane parallel with the planar electrodes and initially having the same initial kinetic energy component in the direction of acceleration. Consequently, when ions are generated in or transported into the initial accelerating or pulsing region of a Time-Of-Flight mass analyzer, conditions are avoided which lead to ion energy or spatial dispersion at the initiation of ion acceleration into the Time-Of-Flight tube drift region. As a practical matter, a population of gaseous phase ions located in the pulsing region will have a non-zero spatial and kinetic distribution prior to pulsing into a Time-Of-Flight tube drift region. This non zero spatial and kinetic energy spread may degrade Time-Of-Flight mass to charge analysis resolution, sensitivity and mass measurement accuracy. In one aspect of the present invention, the spatial and energy spread of an ion population is minimized prior to accelerating the population of ions into a Time-Of-Flight tube drift region.

When ion spatial and energy spread can not be avoided in the TOF pulsing or first accelerating region, it is desirable to have the ion energy and spatial distributions correlated so that both can be compensated and corrected for during the ion flight time prior to hitting the detector. A correlation between the ion kinetic energy component in the TOF axial direction and spatial spread can occur in the TOF pulsing region when spatially dispersed ions with a non random TOF axial kinetic energy component are accelerated in a uniform electric field formed between two parallel electrodes. Wiley et. al., The Review of Scientific Instruments 26(12):1150–1157 (1955) described the configuration and operation of a second ion accelerating region to refocus ions of like mass to charge along the TOF flight path that start their acceleration with a correlated spatial and energy spread. Electrode geometries in the TOF tube and voltages applied to these electrodes can be varied with this technique to position the focal plane of a packet of ions of the same mass to charge value at the detector surface to achieve maximum resolution. The Wiley-McClaren focusing technique improves resolution when ions occupying a finite volume between two parallel plate electrodes are accelerated. In a uniform electric accelerating field, ions of the same m/z value located closer to the repelling electrode will begin their acceleration at a higher potential than an ion of the same m/z initiating its acceleration at a position further from the repelling electrode. The ion that starts its acceleration nearer to the repelling electrode surface at a higher potential, must travel further than the slower ion which starts its acceleration at a lower potential closer to the extraction grid or electrode. At some point in the subsequent ion flight, the faster ion will pass the slower ion of the same m/z value. By adding a second accelerating region, the location of the point where the ions having the same mass to charge value pass and hence are "focused" in a plane, can be optimized to accommodate a desired flight time and flight tube geometry.

The focal point occurring in the first field free region in the TOF drift tube can be "reflected" into a second field free region using an ion mirror or reflector in the ion flight path.

Variations in ion flight time can also be caused by initial ion velocity components not correlated to the spatial spread. This non-correlated ion kinetic energy distribution can be compensated for, to some degree, by the addition of an ion reflector or mirror in the ion flight path. Ions of the same m/z value with higher kinetic energy in the TOF axial direction will penetrate deeper into the decelerating field of an ion reflector prior to being re-accelerated in the direction of the detector. The ion with higher kinetic energy experiences a longer flight path when compared to a lower energy ion of the same m/z value. Subjecting an ion to multiple accelerating and decelerating electric fields allows operation of a TOF mass analyzer with higher order focusing to improve resolution and mass accuracy measurement. Configuration and operation of an Atmospheric Pressure Ion Source Time-Of-Flight mass analyzer with higher order focusing is described by Dresch in U.S. patent application Ser. No. 60/021,184. Higher order focusing corrections can not entirely compensate for initial ion kinetic energy spread in the TOF axial direction that is not correlated with ion spatial spread in the initial pulsing or ion acceleration region. Also, higher order focusing can not entirely compensate for ion energy or spatial spreads which occur during ion acceleration, deceleration or field free flight due to ion fragmentation or ion collisions with neutral background molecules. A ion kinetic energy distribution not correlated to the ion spatial distribution can occur when ionization techniques such as MALDI are used. In MALDI ionization, the sample-bearing surface is located in the initial acceleration region of a Time-Of-Flight mass spectrometer. A laser pulse impinging on a sample surface, in a MALDI ion source, creates a burst of neutral molecules as well as ions in the initial accelerating region of a Time-Of-Flight mass analyzer. Ion to neutral molecule collisions can occur during ion extraction and acceleration into the TOF drift tube resulting in an ion kinetic energy spread, ion fragmentation, degradation of resolution and errors in mass to charge measurement. This problem increases if structural information via ion fragmentation is desired using MALDI Time-Of-Flight mass analysis. Higher energy laser pulses used in MALDI to increase the ion fragmentation also result in increased neutral molecule ablation from the target surface. Even in the absence of ion-neutral collisions, ions generated from the target surface have an initial velocity or kinetic energy distribution that is not well correlated to spatial distribution in the first ion acceleration region. This initial non-correlated kinetic distribution of the MALDI generated ion population can degrade resolution, and mass accuracy performance in Time-Of-Flight mass analysis.

A technique, termed delayed extraction, has been developed where the application of an electric field to accelerate ions into the TOF drift tube is delayed after the MALDI laser pulse is fired to allow time for the neutral gas to expand, increasing the mean free path prior to ion acceleration. By applying a small reverse accelerating field during the MALDI laser pulse and delaying the acceleration of ions into the Time-Of-Flight tube drift region, as described by Vestal et. al. in U.S. Pat. No. 5,625,184, some portion of the low m/z ions can be eliminated. A portion of the low m/z ions, primarily matrix related ions, created in the MALDI process are accelerated back to the sample surface and neutralized when the reverse electric field is applied. A portion of the slower moving higher mass to charge ions do not return to the target surface as rapidly as the lower molecular weight ions when the reverse accelerating field is applied. After an appropriate delay, these higher molecular weight ions may be forward accelerated into the TOF tube drift region by switching the electric field applied between the two electrodes in the first ion acceleration region. Delayed extraction also allows many of the fast fragmentation processes to occur prior to accelerating ions into the Time-Of-Flight tube drift region, resulting in improved mass to charge resolution and mass accuracy measurements for the ions produced in fast fragmentation processes. The delayed extraction technique reduces the ion energy deficit which can occur due to ion-neutral collisions in the first accelerating region but does not entirely eliminate it, particularly with higher energy laser pulses. Also, delayed extraction is effective in improving MALDI Time-Of-Flight performance when lasers with longer pulse durations are used. However, even with delayed extraction, there is a limit to the length of delay time, the magnitude of the reverse field during the delay period, the laser power used and the duration of a laser pulse before overall sensitivity or Time-Of-Flight performance is degraded. The delayed extraction technique requires a balancing of several variables to achieve optimal performance, often with compromises to the Time-Of-Flight mass analysis performance over all or some portion of the mass to charge spectrum generated. The present invention improves the performance of MALDI Time-Of-Flight without imposing the restrictions or limitations of delayed extraction techniques and provides more uniform Time-Of-Flight mass analysis performance over a wider mass to charge range.

When ions are generated in an ion source positioned external to the Time-Of-Flight pulsing or first acceleration region, a technique termed "orthogonal" pulsing has been used to minimize effects of the kinetic energy distribution of the initial ion beam. This orthogonal pulsing technique first reported by The Bendix Corporation Research Laboratories Division, Technical Documentary Report No. ASD-TDR-62-644, Part 1, April 1964, has become a preferred technique to interface external ion sources, particularly Atmospheric Pressure Ionization Sources, with Time-Of-Flight mass analyzers. The ion beam produced from an Atmospheric Pressure Ion Source (API) or an ion source that operates in vacuum, is directed into the gap between the two parallel planar electrodes defining the first accelerating region of the TOF mass analyzer. The primary ion beam trajectory is directed to traverse the gap between the two parallel planar electrodes in the TOF first accelerating region substantially orthogonal to axis of the direction of ion acceleration into Time-Of-Flight tube. With the orthogonal pulsing technique, any kinetic energy distribution in the primary ion beam is not coupled to the ion velocity component oriented in the direction of ion acceleration into the Time-Of-Flight tube drift region. The primary ion beam kinetic energy spread oriented along the beam axis only affects the location of ion impact on the planar detector surface, not the ion arrival time at the detector surface. Apparatus and methods have been developed to improve the duty cycle TOF mass analyzers configured with linear or orthogonal pulsing geometries.

Dresch et. al. in U.S. Pat. No. 5,689,111 describe an apparatus and method for improving the duty cycle and consequently the sensitivity of a Time-Of-Flight mass analyzer. Ions contained in a continuous ion beam delivered from an atmospheric pressure ion source into a multipole ion guide, are trapped in the multipole ion guide and selectively released from the ion guide exit into the TOF pulsing region. This apparatus and technique delivers ion packets into the pulsing or first acceleration region of a TOF mass analyzer from a continuous ion beam with higher efficiency and less ion loss than can be achieved with a continuous primary ion beam delivered directly into the TOF pulsing region. Ion trapping of a continuous ion beam in an ion guide effectively integrates ions delivered in the primary ion beam between TOF pulses. When this apparatus and technique is applied to an orthogonal pulsing TOF geometry, portions of the mass to charge range can be prevented from being accelerated into the Time-Of-Flight drift region, reducing unnecessary detector channel dead time, resulting in improved sensitivity and dynamic range. Operation with the orthogonal pulsing technique has provided significant Time-Of-Flight mass analysis performance improvements when compared with the performance using in-line ion beam pulsing techniques. Even with orthogonal pulsing, it is not always possible to achieve optimal primary ion beam characteristics in the pulsing region whereby all orthogonal velocity components are eliminated or spatially correlated. One embodiment of the invention combines orthogonal ion beam introduction into the TOF pulsing region with ion collection on a surface prior to pulsing the surface collected ion population into the TOP tube drift region. The spatial and energy compression of the ion population on the collecting surface prior to pulsing into the TOF tube drift region improves the Time-Of-Flight performance and analytical capability.

The orthogonal pulsing technique has been configured in hybrid or tandem mass spectrometers that include Time-Of-Flight mass analysis. Two or more individual mass analyzers are combined in tandem or hybrid TOF mass analyzers to achieve single or multiple mass to charge selection and fragmentation steps followed by mass analysis of the product ions. Identification and/or structural determination of compounds is enhanced by the ability to perform MS/MS or multiple MS/MS steps (MS/MS$^n$) in a given chemical analysis. It is desirable to control the ion fragmentation process so that the required degree of fragmentation for a selected ion species can be achieved in a reproducible manner. Time-Of-flight mass analyzers have been configured with magnetic sector, quadrupole, ion trap and additional Time-Of-Flight mass analyzers to perform mass selection and fragmentation prior to a final Time-Of-Flight mass analysis step. Gas phase Collisional Induced Dissociation (CID) and Surface Induced Dissociation (SID) techniques have been used to selectively fragment gas phase ions prior to TOF mass analysis or coupled to the ion flight path in the Time-Of-Flight tube. CID ion fragmentation has been the most widely used of the two techniques. Magnetic sector mass analyzers have been configured to perform mass to charge selection with higher energy CID fragmentation of mass to charge selected ions to aid in determining the structure of compounds. Lower energy CID fragmentation achievable in quadrupoles, ion traps and Fourier Transform mass analyzers, although useful in many analytical applications, may not provide sufficient energy to effectively fragment all ions of interest. High energy CID fragmentation can yield side chain cleavage fragment ion types known as w type fragments. This type of fragmentation is less common in low energy CID processes. The additional ion fragmentation information achievable with higher energy fragmentation techniques can be useful when determining the molecular structure of a compound.

An alternative to CID ion fragramentation is the use of Surface Induced Dissociation to fragment ions of interest. The capability of the Surface Induced Dissociation ion fragmentation technique has been reported for a number of mass analysis applications. Wysocki et. al. J. Am. Soc. for Mass Spectrom, 1992, 3, 27–32 and McCormack et. al., Anal. Chem. 1993, 65, 2859–2872, have demonstrated the use of SID ion fragmentation with quadrupole mass analysis to controllably and reproducibly achieve analytically useful fragmentation information. McCormack et. al. showed that with collisional energies below 100 eV, w and d type ion fragments can be produced from some peptides. Kiloelectronvolt gas phase collisions may be required to achieve similar ion fragmentation. Higher internal energy transfer to an ion can be achieved in SD than with gas phase CID processes allowing the possibility of fragmenting large ions, even those with a large number of degrees of freedom and low numbers of charges. Also, the ion collisional energy distributions can be more tightly controlled with SID when compared with gas phase CID processes. A variety of collision surfaces have been used in SID experiments ranging from metal conductive surfaces such as copper and stainless steel to self-assembled aklyl-monolayer surfaces such as octadecanethiolate ($CH_3(CH_2)17SAu$), ferrocence terminated self assembled aklyl-monolayer surfaces and fluorinated self-assembled monolayer (F-SAM) surfaces ($CF_3(CF_2)7(CH_2)2$ SAu). The self-assembled monolayer surfaces tend to reduce the charge loss to the surface during the SD process. Winger et. al. Rev. Sci. Instrum., Vol 63, No. 12, 1992 have reported SID studies using a magnetic sector-dual electric sector-quadrupole (BEEQ) hybrid instrument. They showed kinetic energy distributions of up to +/−3 eV for parent and fragment ions leaving a perdeuterated alkyl-monolayer surface after a 25 eV collision. SID collisions have been performed by impacting ions traversing a Time-OF-Flight flight tube onto surfaces positioned in the flight tube and Time-OF-Flight mass to charge analyzing the resulting ion population. Some degree of mass to charge selection prior to SID fragmentation has been achieved by timing the deflection of ions as the initial pulsed ion packet traverses the flight tube. SID surfaces have been positioned in the field free regions and at the bottom of ion reflector lens assemblies in TOF mass analyzers. The resulting TOF mass spectra of the SID fragment ions in these instruments generally have low resolution and low mass measurement accuracy due in part to the broad energy distributions of the SD fragment ions leaving the surface. A population of ions acquiring a kinetic energy spread during its flight path or during a re-acceleration step in an ion reflector degrades TOF performance. The present invention reduces the broad kinetic energy distributions of ions produced by SID fragmentation prior to conducting Time-Of-Flight mass analysis. In the present invention, one or more steps of ion mass to charge selection and CID fragmentation can be conducted prior to performing a SD fragmentation step in the TOF pulsing region.

The present invention relates to the configuration and operation of a Time-Of-Flight mass analyzer in a manner that results in improved TOF performance and range of TOF analytical capability. Ions produced from an ion source are directed to a surface located in the pulsing or first acceleration region of a Time-Of-Flight mass analyzer prior to accelerating the ions located on or near the surface into the Time-Of-Flight tube drift region. Depending on the energy at which the ions are brought to the surface and the surface composition, surface induced dissociation or ion to surface reactions may or may not occur. With low energy or soft-landing conditions, surface induced dissociation may be avoided and the surface serves to reduce the ion kinetic energy distribution and spatial spread in the TOF tube axial direction prior to accelerating the surface collected ions into the Time-Of-Flight tube drift region. The soft landing surface collection or surface "focusing" of ions improves the resolution and duty cycle in Time-Of-Flight mass analysis.

Ions entering the TOF first accelerating region are directed onto a surface by applying a reverse potential between the collecting surface and the opposing electrode. Ions collected on the surface are extracted from the surface and or accelerated into the flight tube of a Time-Of-Flight mass analyzer by reversing the electric field between the ion collecting surface and the opposing or extracting electrode or grid. The surface collection and forward acceleration of ion packets can occur at repetition rates exceeding 20 kilohertz allowing TOF pulse repetition rates typically used in gas phase orthogonal pulsing TOF. A low energy laser pulse can be used to release collected ions from surfaces in the presence of an accelerating field. It is desirable to avoid damaging the surface substrate when extracting ions from the surface to reduce unwanted chemical noise in the resulting mass spectra. Frey et. al., Science, 275, 1450, 1997 and Luo et. al., Proceedings of the 45th ASMS Conference on Mass Spectrometry and Allied Topics, 819, 1997 have studied the modification of surface chemistries in F-SAM surfaces. The authors reported using soft-landing of ions on F-SAM surfaces, and after some delay, followed by sputtering of the surface with Xe+ while conducting mass spectrometric analysis. Surface analysis of soft-landed F-SAM surfaces was also conducted using 15-keV Ga+ ion sputtering with TOF mass analysis. Unfortunately, sputtering of ions or neutral molecules damages the surface substrate producing surface substrate related ions. The authors have reported thermally desorbing or evaporating the products of EI generated ions using temperatures ranging from 300° to 400° C. Thermally desorbed ions were mass to charge analyzed with a quadrupole mass spectrometer. Apparatus and methods configured according to the invention can be used achieve ion extraction from a surface after a surface collection step followed by TOF mass to charge analysis without ion sputtering. Depending on the collecting surface material configured, however, some surface damage may be sustained by the sample ions impacted the surface during a surface induced dissociation fragmentation step.

The magnitude of the reverse electrical potential applied between the surface and the extraction electrode determines the impact energy an ion will have on the surface prior to being forward accelerated into the Time-Of-Flight tube drift region. Ions can be directed to the collecting surface with a soft-landing by applying a low electrical field between the collecting surface and the counter electrode in the TOF pulsing region. Surface induced dissociation of ions can be achieved, prior to pulsing the resulting ion population into the Time-Of-Flight drift region, by increasing the reverse electric field directing the ions to the collecting surface. A variety of ion sources can be configured according to the invention with ability to conduct SID with TOF mass analysis. Ions can be produced directly in the TOF first acceleration region or produced external to the first acceleration region. A time-of-flight configured according to the invention can be selectively operated with or without surface collection, surface induced dissociation or reaction of ions with surfaces prior to Time-Of-Flight mass analysis. The invention retains the ability to conduct existing ionization and TOF analysis techniques. The added ion surface collection and SID fragmentation capability greatly expands the overall analytical range of a Time-Of-Flight mass analyzer. A Time-Of-Flight mass analyzer configured and operated according to the invention can be included in a hybrid mass analyzer enhancing MS/MS or MS/MS" operation and operated with a range of ion sources.

SUMMARY OF THE INVENTION

The pulsing or ion extraction region of a Time-Of-Flight mass spectrometer configured with two parallel planar electrodes is configured such that neutral, retarding and ion extraction electric fields can be applied between the two electrodes. The electronics providing voltage to these electrodes is configured such that the neutral, forward and reversed biased electric fields can be rapidly applied by switching between power supplies. In one embodiment of the invention, ions produced in an ion source form an ion beam that enters the pulsing region with the ion beam trajectory substantially parallel to the surfaces of the planar electrodes that define the pulsing region. During the time period when ions are entering the TOF pulsing region, a slight reverse bias field is applied across the two planar electrodes to direct the ions to the collecting electrode surface. In this manner ions are collected on or near the electrode surface for a selected period of time before a forward bias electric field between the planar electrodes is applied, accelerating ions from the ion collecting surface into the TOF tube drift region of the mass analyzer. The primary ion beam is prevented from entering the pulsing region just prior to applying the ion forward accelerating potential to eliminate any ions located in the gap between the electrodes prior to ion acceleration into the TOF tube. The soft-landing continuous collecting of ions on or near the collecting electrode surface, reduces the initial ion beam spatial and energy spread of the primary ion beam prior to acceleration or pulsing of the ion population into the Time-Of-flight tube drift region. Accelerating an ion packet initially shaped as a thin plane at or near the collecting surface into the TOF flight tube improves the resolution and mass accuracy compared with an orthogonally pulsed gas phase primary ion beam. The duty cycle is improved by collecting all m/z value ions with equal efficiency prior to pulsing. The duty cycle of conventional non-trapping continuous beam orthogonal pulsing decreases with the ion mass to charge value. Collecting ions on a surface prior to pulsing reduces the mass to charge duty cycle discrimination in conventional continuous ion beam orthogonal pulsing Time-Of-Flight mass analysis. The duty cycle is also improved because the process of collecting ions on the collecting electrode surface prior to pulsing, serves as a means of integrating ions prior to acceleration into the TOF tube. The ion integration or collection time, however, is limited by space charge buildup on the dielectric or non-conducting collecting surface potentially limiting the number of ions which may be effectively collected prior to pulsing. The space charging at the collecting surface can be controlled to some degree by varying the pulse repetition rate of ions into the TOF mass analyzer. Pulse rates exceeding 20 KHz can be used limited only by the flight time of the mass to charge range of interest.

In another embodiment of the invention, the Time-Of-Flight pulsing region configured for orthogonal pulsing, comprises two parallel planar electrodes, between which neutral, retarding and accelerating fields may be applied. The electric fields can be applied by rapidly switching power supply outputs to one or both electrodes. Ions traveling into the pulsing region with trajectories substantially parallel to the planar electrode surfaces, traverse the pulsing region with a neutral electric field applied between the two planar electrodes. After a selected period of time, a retarding or reverse electric field is applied between the planar electrodes directing the ions located in the pulsing region gap toward the collecting electrode surface. After a preset delay, an accelerating field is applied between the two planar electrodes and the ions are accelerated from the collecting electrode surface into the Time-Of-Flight drift region. One or more ion surface collecting pulses can precede an extraction pulse into the Time-Of-Flight drift region. The magnitude of the reverse or collecting electric field can be set to cause surface induced dissociation (SID) or, alternatively, soft landing of ions when they impact on the surface prior to accelerating the resulting parent or fragment ion population into the Time-Of-Flight drift region.

In another embodiment of the invention, the collecting surface material is configured to minimize charge exchange when an ion impacts the surface. The ion collection time prior to extraction can be set to be sufficiently long to create a space charge near the collecting surface as ions accumulate on or near the surface. This space charge aids in releasing later arriving ions when a rapid reversal of the electric field in the TOF first acceleration region is applied. Alternatively, a laser pulse can be applied to the surface to release ions from the surface in the presence of an accelerating field or with delayed extraction conditions. The laser energy can be set so that sufficient energy is available to release the existing ion population from the surface while minimizing damage to the surface. In some applications, the collecting surface can be heated to facilitate the release of ions from the surface. Collecting surface materials that minimize charge exchange improve ion yield in SID or soft-landing operation resulting in higher TOF sensitivity. The collecting electrode assembly can be comprised of multiple electrode segments with different voltages applied to each segment. Voltages can be applied to a multiple segment electrode during ion collection to direct ions to a particular region of the total electrode surface or to contain ions in a potential well near a dielectric surface as space charge occurs.

In yet another embodiment of the invention, ions are created in the pulsing region of a Time-Of-Flight mass analyzer while maintaining a substantially neutral field between the two electrodes of the pulsing region. The resulting ion population is subsequently directed to the collecting electrode surface prior to pulsing of the ions into the Time-Of-Flight drift region. A specific example of such an embodiment of the invention is the configuration of an Electron Ionization (EI) source in the pulsing region of the Time-Of-Flight mass analyzer. Sample bearing gas is introduced at low pressure into the pulsing region of a Time-Of-Flight mass analyzer with a neutral electric field applied across the pulsing region gap. An electron-emitting filament is turned on with the emitted electrons accelerated into the pulsing region gap to ionize the gas phase sample present. The electron-emitting filament is turned off and a reverse electric field is applied across the pulsing region gap to direct the gaseous ions produced to move toward the collection electrode surface. When the EI generated ions have been collected on or near the collecting electrode surface, an accelerating field is applied across the pulsing region gap to accelerate the ions at or near the collecting surface into the drift region of the Time-Of-Flight mass analyzer. The EI generated ions can be directed to the collecting electrode surface with sufficient energy to cause surface induced dissociation or with low energy to allow a non fragmenting soft-landing. The sample gas may be supplied from a variety of inlet systems including but not limited to a gas chromatograph. Collecting EI generated ions on a surface prior to pulsing into the Time-Of-Flight drift region reduces the ion kinetic energy distribution and spatial spread. This results in higher resolution and mass accuracy Time-Of-Flight mass to charge analysis. If electron ionization occurs in the presence of a low amplitude surface collecting field, the ratio of ionization time to TOF ion acceleration and flight time can be increased resulting in higher overall Time-Of-Flight duty cycle.

In another embodiment of the invention, the pulsing region of a Time-Of-Flight mass analyzer is comprised of two planar electrodes positioned substantially parallel and set a distance apart so as to create a gap between them. This gap is referred to as the TOF first accelerating or pulsing region. The first electrode positioned furthest from the Time-Of-Flight drift region is configured as an ion collecting surface to which ions are directed prior to pulsing into the Time-Of-Flight drift region. A neutral, collecting or extraction electric field can be applied between the two pulsing region electrodes to allow collecting of ions on or near the collecting electrode surface prior to pulsing the spatially compressed ions into the Time-Of-Flight tube drift region. Alternatively, a laser pulse can be applied to the collecting surface to release ions rapidly into an accelerating or delayed extraction field. In this embodiment of the invention, ions generated external to the TOF pulsing region enter the pulsing region in a direction substantially not parallel to the planar electrode surfaces which bound the pulsing region. During the collection period, a reverse electric field is applied across the pulsing region gap to direct ions to the collecting electrode surface. The ions may enter the pulsing region gap with an initial trajectory that is directed either toward or away from the collecting surface. After the ion collection period, the electric field is reversed in the pulsing region and ions on or near the collecting surface are accelerated into the Time-Of-Flight tube for mass to charge analysis. This embodiment of the invention, provides a means for directing ions into a Time-Of-Flight pulsing region from wide variety of ion sources or hybrid instrument electrode geometries with minimal impact on the Time-Of-Flight performance. Depending on the electric field strength applied to direct ions to the collecting surface, ions can impact the collecting surface with a soft-landing or with sufficient energy to cause surface induced dissociation fragmentation. Ions can be collected for a period of time prior to pulsing into the Time-Of-Flight drift region, improving the duty cycle for some applications and operating modes.

In another embodiment of the invention, non-planar electrodes may be configured in the pulsing region. Alternatively, the pulsing or first accelerating region of the time-of-flight mass analyzer may be configured with a three dimensional quadrupole ion trap or a multipole ion guide. One or more surfaces within these non-planar electrode geometries may be configured to serve as a collecting surface or surfaces to reduce the ion population spatial and energy distribution prior to accelerating the ion population into the Time-Of-Flight mass analyzer. Conversely, the non-planar surfaces may be used to fragment ions by SD prior to accelerating the resulting ion population into a TOF tube. When three dimensional quadrupole ion traps or multipole ion guides are configured in the TOF pulsing region, ions released from the surfaces in these electrode geometries may be trapped by the RF electric fields applied to the electrodes prior to extracting the ions into the Time-Of-Flight tube. The gas phase RF trapping of ions after surface ion collection or SD fragmentation is an added step in a TOF mass analysis sequence when compared to the planar electrode geometry configured in the pulsing region. The ion trapping, however, may be used to enhance the analytical capability of the Time-Of-Flight mass analyzer. The same analytical sequences described for planar geometry electrodes configured in the TOF pulsing region can be applied to the non-planar pulsing region electrode configurations to improve Time-Of-Flight performance and analytical capability.

The invention can be configured with a wide range of ion sources including but not limited to, Electron Ionization (EI), Chemical Ionization (CI), Laser Desorption (LD), Matrix Assisted Laser Desorption (MALDI), Electrospray (ES), Atmospheric Pressure Chemical Ionization (APCI), Pyrolysis MS, Inductively Coupled Plasma (ICP), Fast Atom Bombardment (FAB), and Secondary Ion Mass Spectrometry (SIMS). Ions may be subjected to one or more mass to charge selection and /or fragmentation steps prior to entering the Time-Of-Flight pulsing region. The Time-Of-Flight mass analyzer may be configured as a single mass to charge analyzer or as part of a hybrid or tandem instrument. A hybrid Time-Of-Flight mass analyzer configured according to the invention, may include multipole ion guides including quadrupole mass analyzers, magnetic sector, ion trap or additional Time-Of-Flight mass analyzers. According to the invention, analytical sequences can be run that include ion surface induced dissociation alternating with or sequential to gas phase collision induced dissociation in hybrid or tandem mass analyzer configurations. The invention can be used to study ion-surface interactions as well with prior mass to charge selected ion populations. The collecting surface described in the invention may be comprised of a variety of materials including but not limited to metals or other conductor material, semiconductor materials, dielectric materials, Self Assembled Monolayers (SAM) or combinations of materials.

BRIEF DESCRIPTION OF THE FIGURES

FIG. 10 is a diagram of one embodiment of the invention wherein, ions produced by MALDI ionization are directed through an orifice in the collecting surface.

DETAILED DESCRIPTION OF THE INVENTION AND THE PREFERRED EMBODIMENTS

Figure 1:
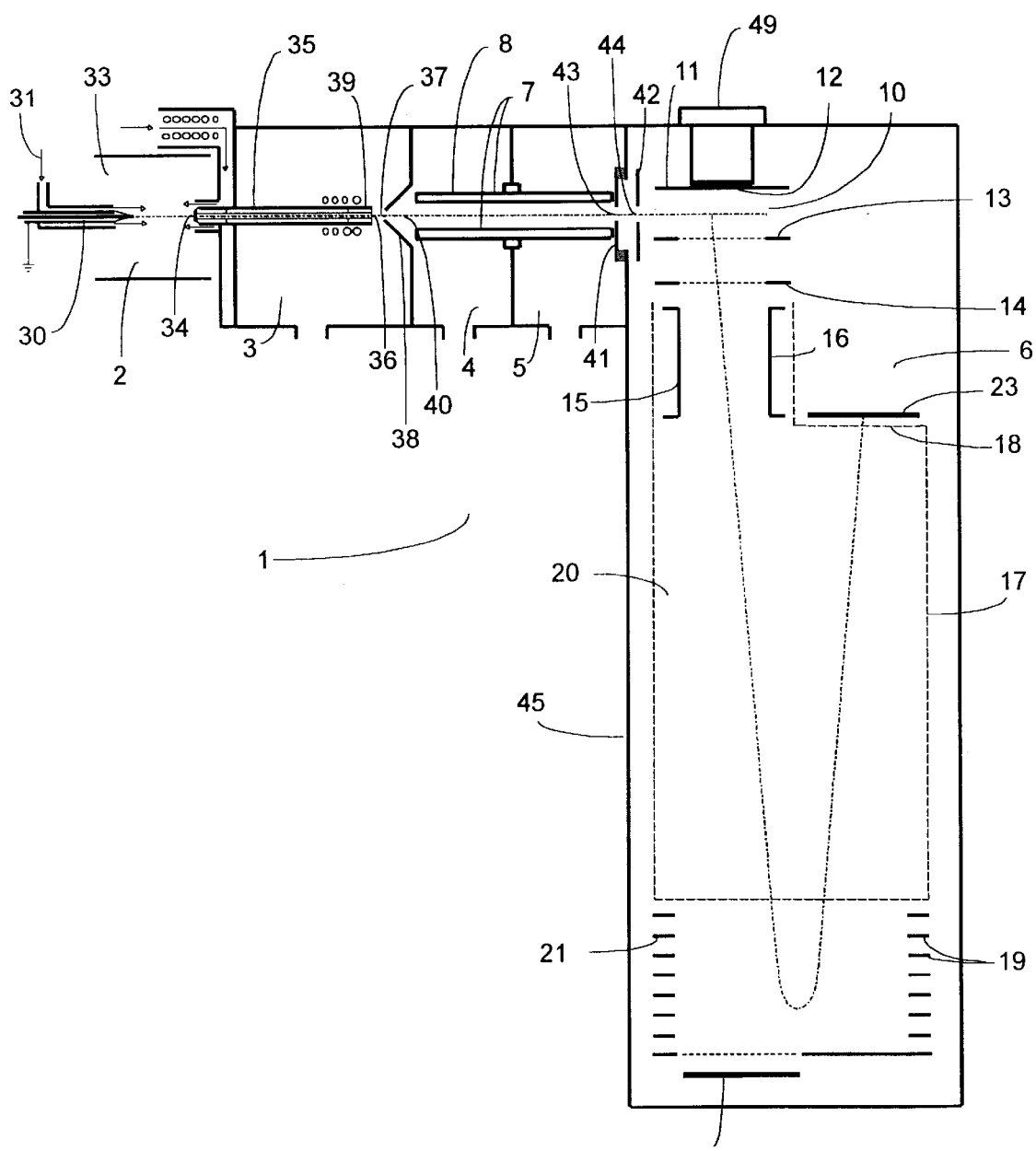
FIG. 1 is a diagram of an orthogonal pulsing Time-Of-Flight mass analyzer configured with an Electrospray ion source and an ion collecting surface in the Time-Of-Flight pulsing region.

Time-Of-Flight (TOF) mass analyzers that incorporate a linear or an orthogonal pulsing region as a means for pulsing ion bunches into the Time-Of-Flight tube are well known to those skilled in the art. Orthogonal pulsing Time-Of-Flight (O-TOF) mass analyzers are typically configured with the ion source located external to the TOF pulsing region. The primary beam of ions exiting an ion source is directed into the pulsing region of the TOF with a trajectory oriented substantially orthogonal to the axis of the Time-Of-Flight tube drift region. Several types of ion sources can be interfaced with orthogonal pulsing Time-Of-Flight mass analyzers. These include but are not limited to Electron Ionization (EI), Chemical ionization (CI), Photon and Multiphoton Ionization, Fast Atom Bombardment (FAB), Laser Desorption (LD), Matrix Assisted Laser Desorption (MALDI). Thermospray (TS), sources as well as Atmospheric Pressure Ion (API) sources including Electrospray (ES), Atmospheric Pressure Chemical Ionization (APCI), Pyrolysis and Inductively Coupled Plasma (ICP) sources. Othogonal pulsing Time-Of-Flight mass analyzers have been configured in tandem or hybrid mass spectrometers. Ions can be delivered to the Time-Of-Flight orthogonal pulsing region from several mass analyzer types including but not limited to multipole ion guides including quadrupoles, hexapoles or octopoles or combinations thereof, triple quadrupoles, magnetic sector mass analyzers, ion traps, Time-Of-Flight, or Fourier transform mass analyzers. Hybrid or tandem instruments allow one or more steps of mass to charge selection or mass to charge selection with fragmentation (MS or MS/MS$^n$) combined with orthogonal pulsing Time-Of-Flight mass analysis.

One preferred embodiment of the invention is the configuration of an orthogonal Time-Of-Flight pulsing region such that ions entering the puling region can be directed to a collecting surface electrode located in the pulsing region prior to pulsing the ions into the Time-Of-Flight drift region. The energy by which ions are directed to the surface can be varied by setting the appropriate voltages applied to the two planar electrodes defining the TOF pulsing region. Ions can be directed to the collecting surface electrode with low energy to allow soft-landing conditions with little or no fragmentation. Soft-landing collection of ions at the collection electrode surface prior to acceleration of the ions into the Time-Of-Flight drift region serves to decrease the ion energy distribution and spatial spread resulting in increased Time-Of-Flight resolution and mass accuracy. Alternatively, ions can be directed to the collecting electrode surface with energy sufficient to cause surface induced dissociation (SID) fragmentation when the ions impact the surface. Surface induced dissociation can serve as the primary ion fragmentation method or can compliment ion fragmentation accomplished with gas phase collisional induced dissociation conducted in a tandem MS or hybrid mass spectrometer prior to performing Time-Of-Flight mass analysis. One example of a hybrid mass analyzer with a preferred embodiment of the invention is diagrammed in FIG. 1.

FIG. 1 is a diagram of an orthogonal pulsing Time-Of-Flight mass analyzer configured with an Electrospray (ES) ionization source and a multipole ion guide ion trap. The multipole ion guide that extends continously into multiple vacuum pumping stages can be operated in RF only, mass to charge selection or ion fragmentation mode as described in U.S. patents numbered U.S. Pat. Nos. 5,652,427 and 5,689,111, and U.S. patent applications with Ser. Nos. 08/694,542 and 08/794,970. The instrument diagrammed can be operated in MS or MS/MS$^n$ mode with gas phase collisional induced dissociation (CID). In addition, the invention allows surface induced dissociation and surface collection of ions prior to ion pulsing into the flight tube of the time-Of-Flight mass analyzer. Hybrid Time-Of-Flight mass analyzer 1 diagrammed in FIG. 1 includes Electrospray ion source 2, four vacuum pumping stages 3, 4, 5 and 6 respectively, multipole ion guide 8 that extends into vacuum pumping stages 4 and 5, orthogonal Time-Of-Flight pulsing region 10 with collecting surface electrode 11 and removable collecting surface 12, Time-Of-Flight drift region 20, single stage ion reflector or mirror 21 and detectors 22 and 23. Liquid sample bearing solution is sprayed into Electrospray source 2 through needle 30 with or without pneumatic nebulization assist provided by nebulization gas 31. The resulting ions produced from the Electrospray ionization in Electrospray chamber 33 are directed into capillary entrance orifice 34 of capillary 35. The ions are swept though capillary 35 by the expanding neutral gas flow and enter the first vacuum stage 3 through capillary exit orifice 36. A portion of the ions exiting capillary 35 continue through skimmer orifice 37 and enter multipole ion guide 8 at entrance end 40 located in the second vacuum pumping stage 4. Ions exiting ion guide 8 pass through orifice 43 in exit lens 41 and through orifice 44 of focusing lens 42 and are directed into pulsing region or first accelerating region 10 of Time-Of-Flight mass analyzer 45 with a trajectory that is substantially parallel to the surface of planar electrodes 11 and 13. The surfaces of planar electrodes 12 and 13 are positioned perpendicular to the axis of Time-Of-Flight drift tube 20. Ion collecting surface 12 is configured as part of collecting electrode 11 and counter or ion extraction electrode 13 is configured with a high transparency grid through which ions are accelerated into Time-Of-Flight drift region 20. The gap between collection electrode 11 with collection surface 12 and counter electrode 13 defines the orthogonal pulsing or first accelerating region 10.

During orthogonal pulsing TOF operation, a substantially neutral or zero electric field is maintained in pulsing region 10 during the period when ions are entering the pulsing region from multipole ion guide 8. At the appropriate time, an accelerating field is applied between electrodes 11 and 12 to accelerate ions into Time-Of-Flight tube drift region 20. During the initial ion acceleration and subsequent ion flight period, the appropriate voltages are applied to lenses 11, 13, 14, steering lenses 15 and 16, flight tube 17, ion reflector electrodes 19, post accelerating grid 18 and detector 23 to maximize Time-Of-Flight resolution and sensitivity. Ions pulsed from the Time-Of-Flight first accelerating region 10 may be directed to impact on detector 22 or 23 depending on the analytical result desired. If the pulsed ion beam is steered with steering lenses 15 and 16, detector 22 or 23 can be tilted as is described in U.S. Pat. No. 5,654,544 to achieve maximum resolution. TOF mass analyzer 1 may also be operated in orthogonal pulsing mode without collecting ions on surface 12 prior to pulsing into Time-Of-Flight tube drift region 20. Prior to entering Time-Of-Flight pulsing region 10, the original ion population produced by Electrospray ionizaton may be subjected to one or more mass selection and/or fragmentation steps. Ions may be fragmented through gas phase collisional induced dissociation (CID) in the capillary skimmer region by applying the appropriate potentials between the capillary exit electrode 39 and skimmer 38. In addition, the analytical steps of ion trapping and/or single or multiple step mass to charge selection with or without ion CID fragmentation can be conducted in multipole ion guide 8 as described in U.S. Pat. No. 5,689,111 and U.S. patent application Ser. No. 08/694,542. Said mass selection and CID fragmentation steps are achieved by applying the appropriate RF, DC and resonant frequency potentials to rods or poles 7 of multipole ion guide 8. A continuous or gated ion beam of the resulting ion population in multipole ion guide 8 can be transmitted into Time-Of-Flight pulsing region 10 from ion guide 8 through electrode or lens orifices 43 and 44.

Figure 2A:
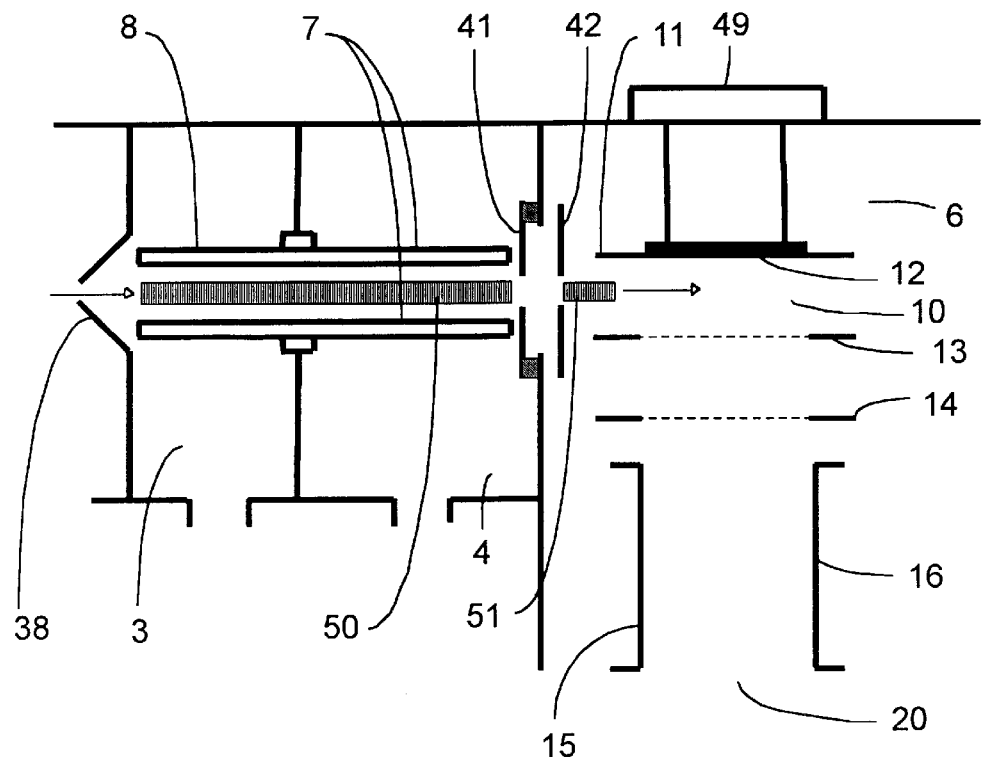
FIGS. 2A through 2D diagram of one embodiment of the invention wherein initially trapped ions are introduced batchwise into the Time-Of-Flight pulsing region, collected on the pulsing region collecting surface and subsequently accelerated into the Time-Of-Flight tube.

FIGS. 2A through 2D illustrates a progression of steps embodied in the invention wherein ions trapped in ion guide 8 are gated into Time-Of-Flight pulsing region 10 and collected on collecting surface 12 prior to accelerating said ions into Time-Of-Flight tube drift region 20. Referring to FIG. 2A, ions 50 are initially trapped in multipole ion guide 8 by setting a retarding or trapping potential on exit lens 41 relative to the DC offset potential applied to ion guide rods 7 as is described in U.S. Pat. No. 5,689,111. A substantially neutral or zero field is set in pulsing region 10. The retarding potential applied to lens 41 is lowered for a set time period, then reapplied, to gate ion packet 51 from ion guide 8 into pulsing region 10. The translational energy of ion packet 51 is determined by the voltage difference between the ion guide offset potential and the substantially equal voltages set on electrodes 11 and 13. During the period when the ions are being gated out of ion guide 8, voltages are applied to electrodes or lenses 41 and 42 to optimize the ion transfer into pulsing region 10. Ideally, ions traversing pulsing region 10 prior to pulsing into TOF tube drift region 20 should have no velocity component in the direction perpendicular to the surface of lenses 11 and 13. As this condition is difficult to achieve, alternatively, the initial ion trajectory in the pulsing region should be directed such that any orthogonal component of velocity should be correlated to the ion spatial location. Such a condition can be approximated if ions are directed into the pulsing region as a parallel beam or from a point source as is described in U.S. patent application Ser. No. 60/021,184. In practice, ions contained in ion packet 51 that enter Time-Of-Flight pulsing region 10 have the primary direction of their initial velocity parallel to the surface of lenses 11 and 13 with a small component of velocity in the non parallel or orthogonal direction. The lower the axial velocity component of ion packet 51, the more difficult it is to optimize the ion trajectory into pulsing region 10. In practice, below 10 eV, it becomes difficult to prevent an increase in the orthogonal velocity and spatial distribution of ion packet 51 as it traverses pulsing region 10. In the embodiment of the invention diagrammed in FIG. 2, ions traversing pulsing region 10 are directed toward collecting surface 12 of electrode 11 prior to being pulsed into Time-Of-Flight tube drift region 20. The collection of ions on surface 12 prior to extraction, reduces the initial ion packet spatial and energy spread in pulsing region 10. By compressing ions on or near surface 12 prior to pulsing the ion packet into TOF tube drift region 20, energy and spatial distributions of the initial ion packet can be improved, compared to pulsing from a gas phase primary ion beam. The surface collection of ions decouples the TOF pulse from the primary ion beam velocity or spatial distribution.

Consequently, Time-Of Flight resolution can be improved over a wide range of primary ion beam conditions with soft-landing or surface induced dissociation of ions on collecting surface 12 prior to acceleration into Time-Of-Flight tube drift region 20. Examples of ion collection and extraction sequences from collecting surface 12 will be described with reference to FIGS. 2 through 10.

Figure 2B:
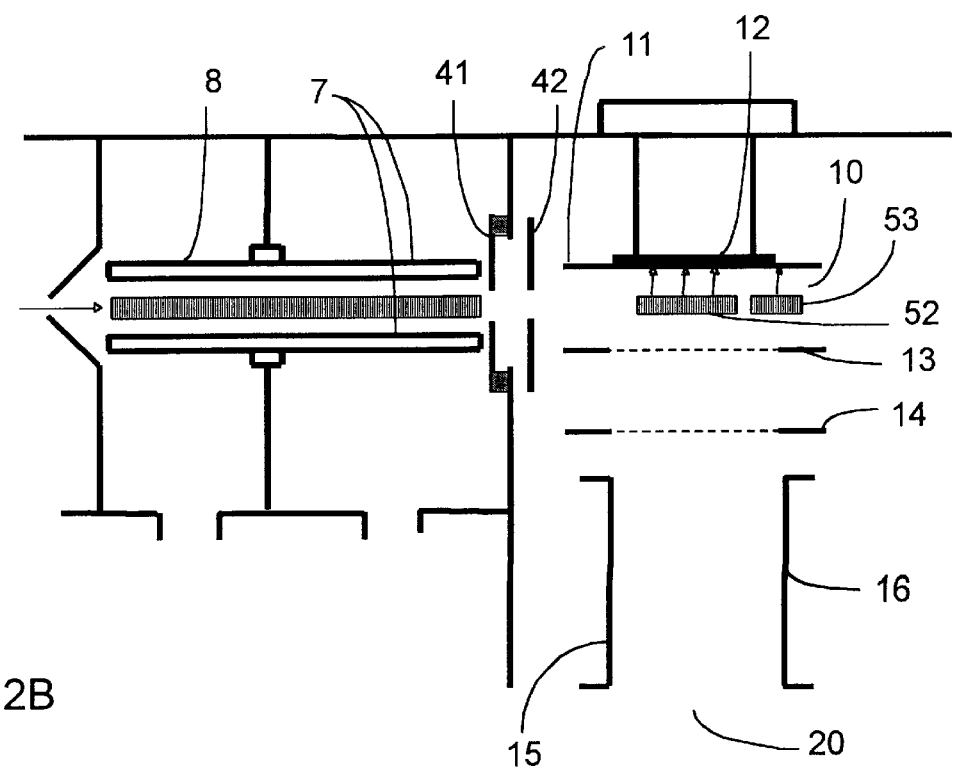

Depending on the initial length of ion packet 51 as determined by the gate ion release time, some Time-Of-Flight mass to charge separation can occur in the primary ion beam as ion packet 51 traverses pulsing region 10. By timing the gate ion release time and the travel time of the resulting ion packet into the pulsing region prior to orthogonal pulsing, a portion of the mass to charge scale can be prevented from entering Time-Of-Flight tube drift region 20 as described in U.S. Pat. No. 5,689,111. As diagrammed in FIG. 2B, Time-Of-Flight separation occurrs between ions of different mass to charge in initial ion packet 51 as ion packet 51 traverses pulsing region 10 forming separate ion packets 52 and 53. Lower mass to charge ions comprising ion packet 53 have a higher velocity than the higher mass to charge ions comprising ion packet 52 causing mass to charge separation as initial ion packet 51 traverses pulsing region 10. FIG. 2B shows the point in time where the neutral field in pulsing region 10 has been switched to a field that directs the ions in packets 52 and 53 toward electrode 11 and collecting surface 12. Ions in packet 53 are beyond the usable pulsing region volume and are eliminated from any subsequent extraction into Time-Of-Flight tube drift region 20. This is desirable in some analytical applications where lower mass to charge ions that are not of interest can deaden detector channels prior to the arrival of higher mass to charge ions at the detector surface for a given TOF pulse. Removing lower mass to charge ions in a TOF pulse can increase the sensitivity and reproducibility of higher mass to charge ion detection for a given analysis. Ion packet 52 is directed toward collecting surface with a preset energy to achieve a soft-landing of ions or surface induced dissociation fragmentation of ions in ion packet 52. The energy of impact will be determined by the combination of the parallel and orthogonal kinetic energy components at the point when the ion impacts the surface. The ion orthogonal velocity component at impact is determined by, the collecting electric field applied in pulsing region 10, and the initial ion position in pulsing region 10 when the collecting electric field is applied. The impact energy of the ion on collecting surface 12 will also be affected by the degree of space charge present on the surface, particularly when collecting surface 12 is configured with a dielectric material. It may be desirable for a collecting surface to maintain some degree of space charge to facilitate the extraction of ions directed toward or collected on collecting surface 12.

Figure 2C:
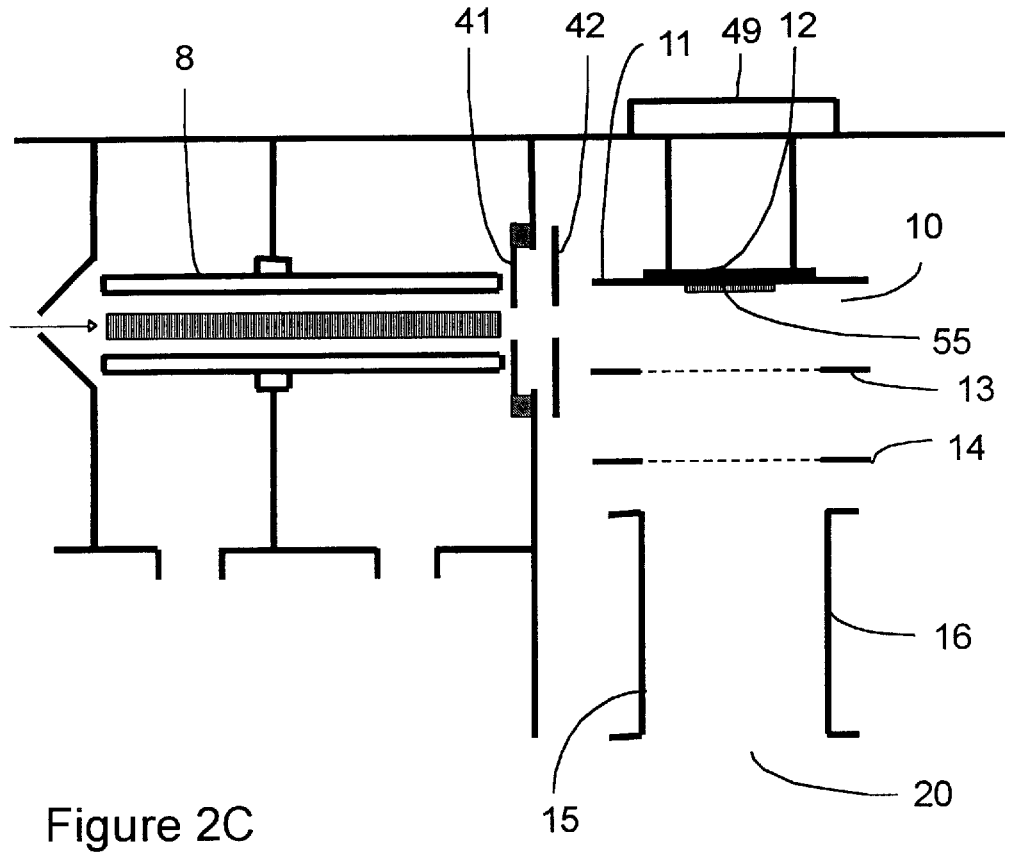
Figure 2D:
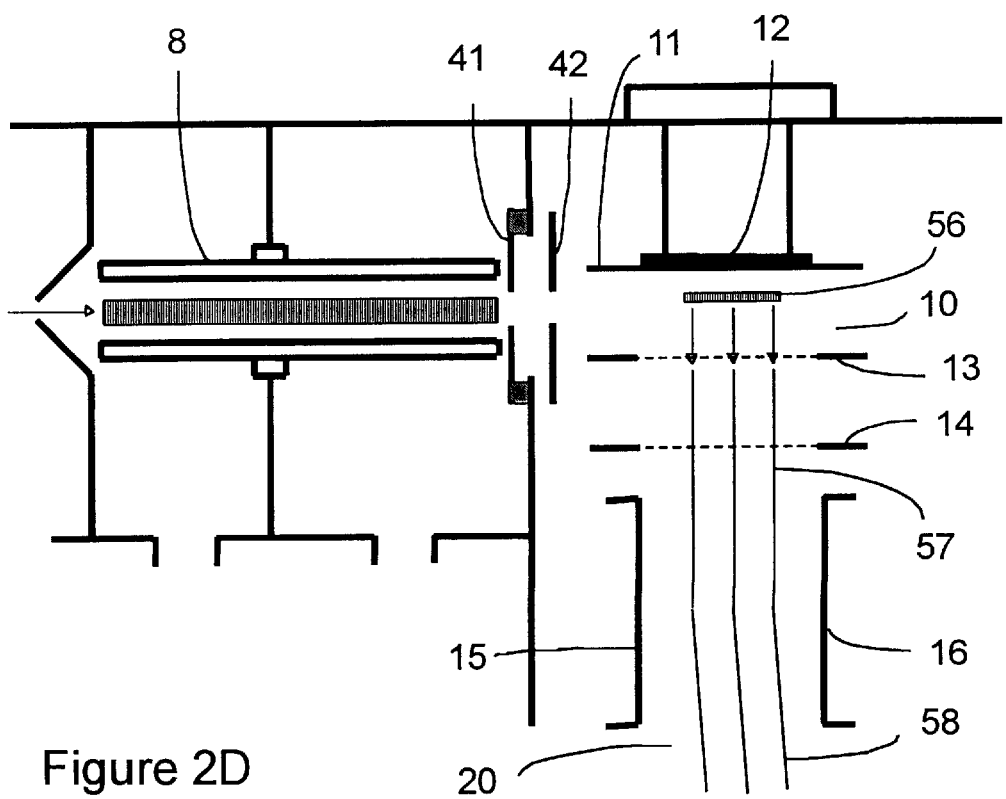
Figure 3A:
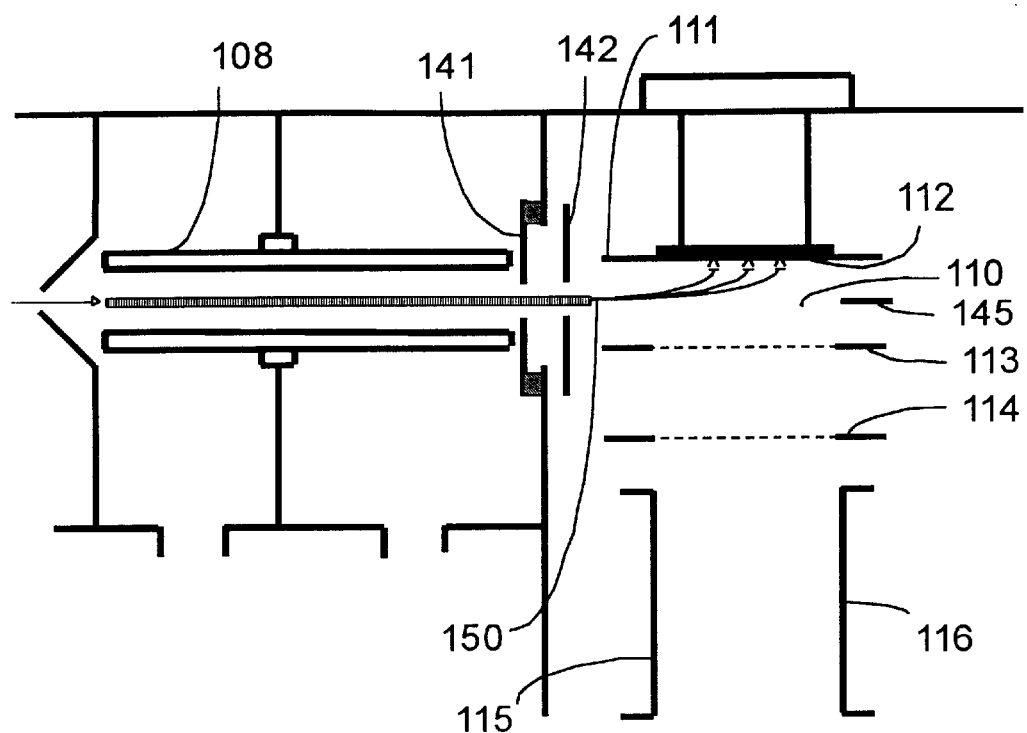
FIGS. 3A through 3D diagram one embodiment of the invention wherein ions are collected on the collecting surface in the Time-Of-Flight pulsing region from a continuous ion beam prior to acceleration into the Time-Of-Flight tube.
Figure 3B:
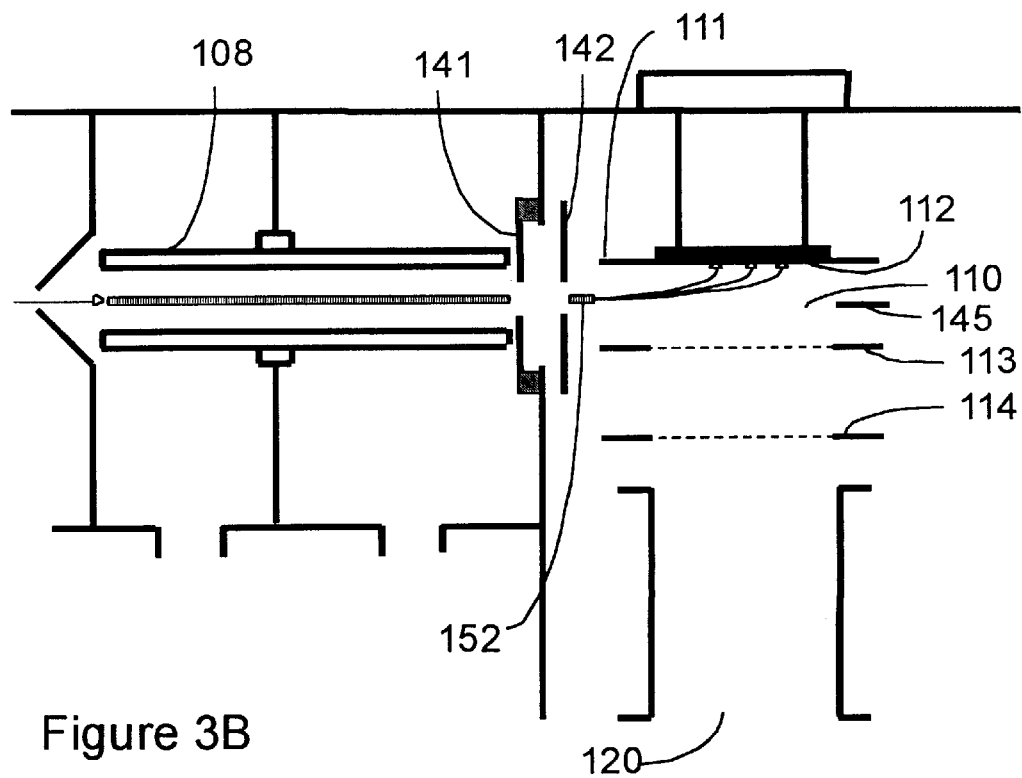
Figure 3C:
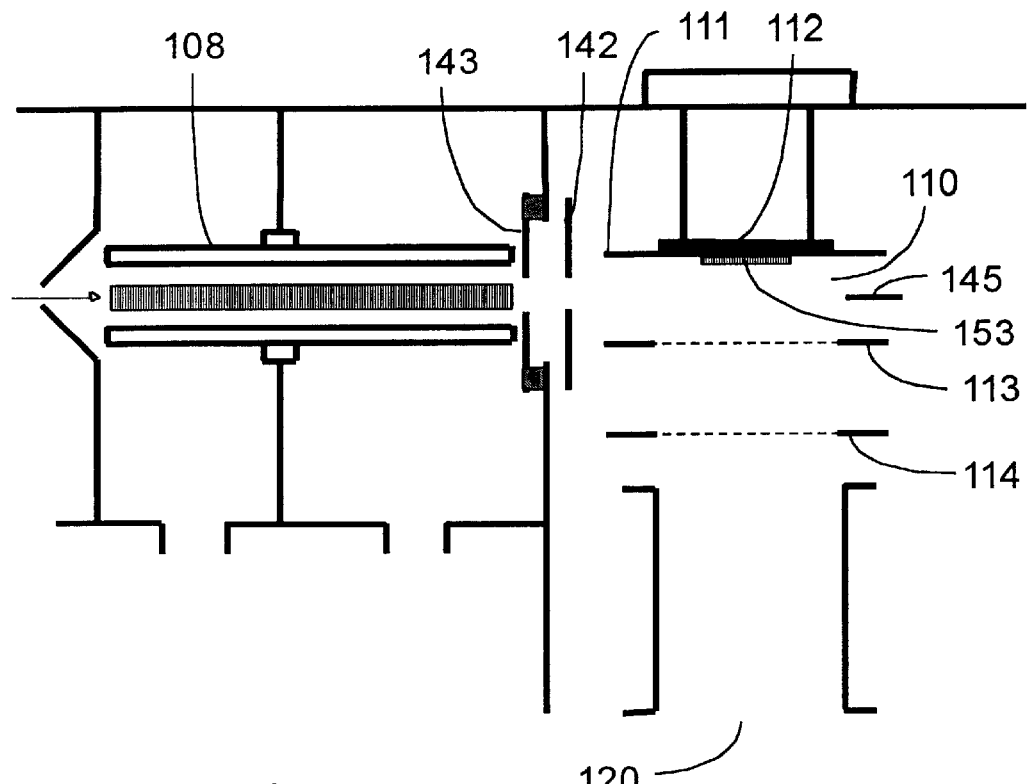
Figure 3D:
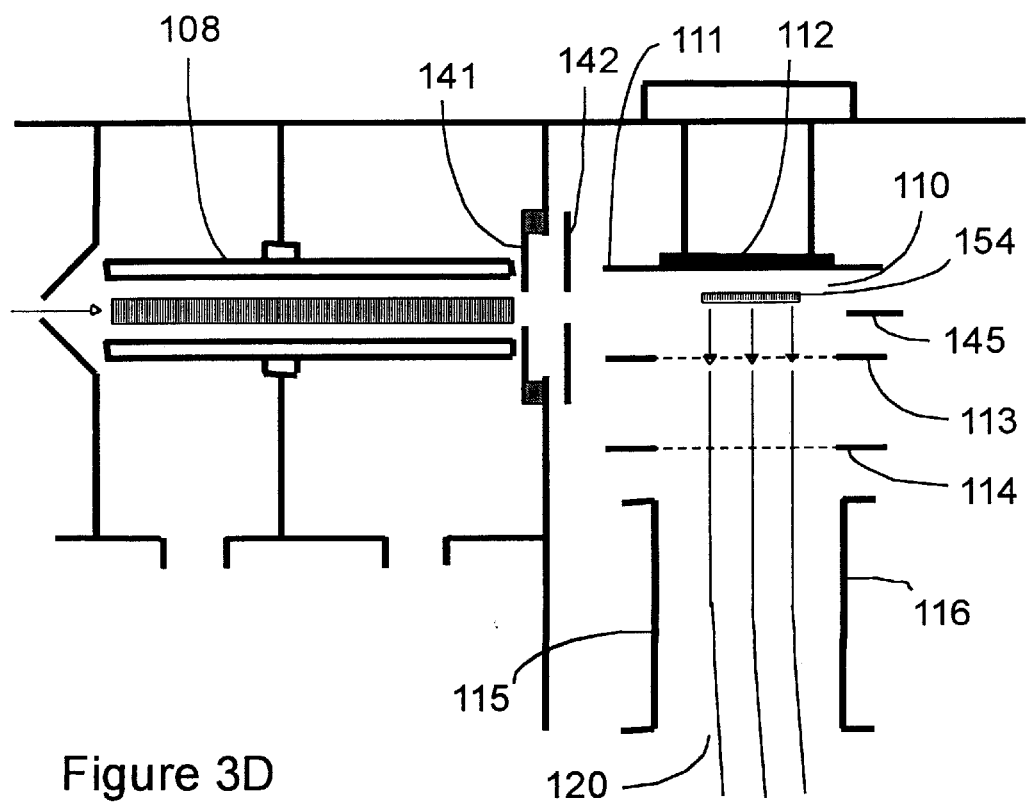

After applying a collecting or reverse electric field in pulsing region 10 for a set time period, the electric field is reversed in pulsing region 10. FIG. 2C shows the initial position of ion packet 55 comprised of soft-landed ions or SID fragment ions located on or near collecting surface 12 just as the forward accelerating electric field is applied in pulsing region 10. Referring to FIG. 2D, the applied forward ion accelerating electric field extracts ion packet 56 from collecting surface 12 and directs the ions comprising ion packet 56 into Time-Of-Flight tube drift region 20. The ion trajectory may be altered by applying a non-zero electric field between steering electrodes 15 and 16. In this manner the ions comprising extracted ion packet 56 may be directed to impact on detector 22 or 23. In one embodiment of the invention, the timing and application of voltages to electrodes 41, 42, 11, 13, 15 and 16 are controlled by the configuration of power supplies, switches and controllers as diagrammed in FIG. 4. FIGS. 5A and 5B diagram one embodiment of the invention wherein the collecting surface is configured with multiple dielectric and conduct layers. With timing coordinated with switch controller 62 in FIG. 4, voltages are switched between conductive layers to remove the image charge formed on the reverse side of the dielectric collecting surface layer. Rapid removal of the image charge aids in releasing trapped ions from the collecting surface during the forward ion accelerating step.

Figure 4:
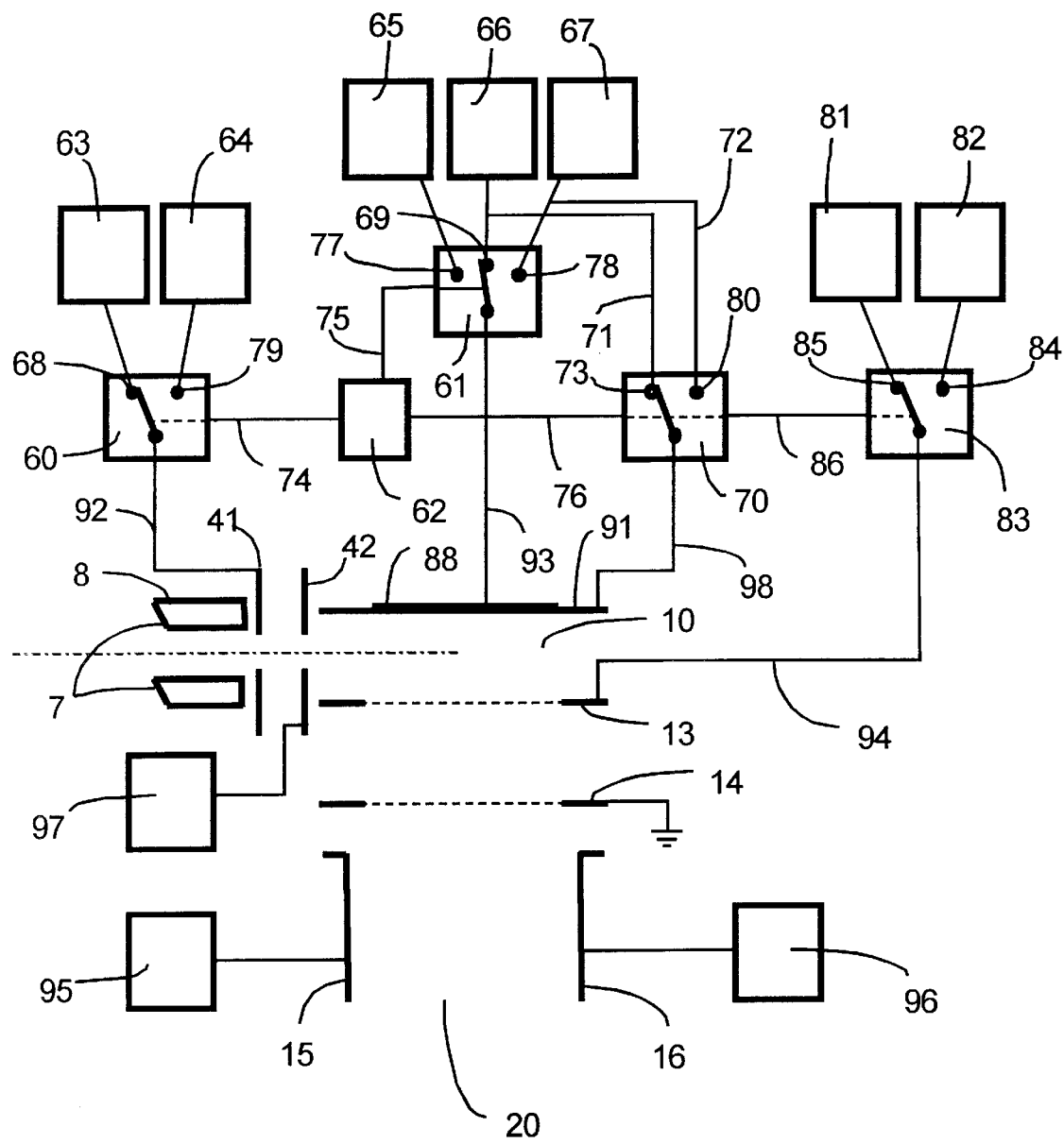
FIG. 4 is a diagram of one embodiment of the invention wherein multiple power supplies are switched to electrostatic lenses to allow surface collection of ions in a TOF pulsing region and acceleration of said ions from the pulsing region of a Time-Of-Flight mass analyzer.
Figure 5A:
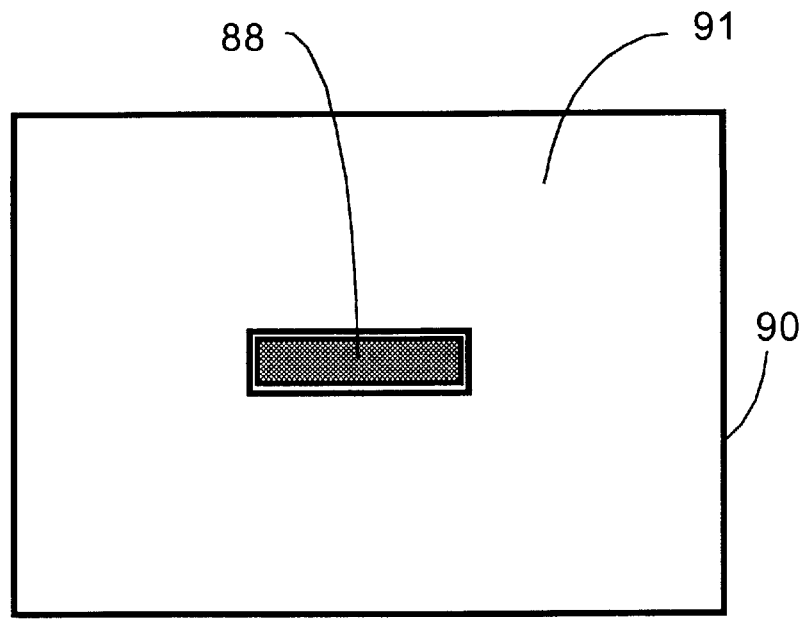
FIG. 5A is a top view diagram of one embodiment of a dielectric collecting surface electrically insulated from a surrounding electrode.
Figure 5B:
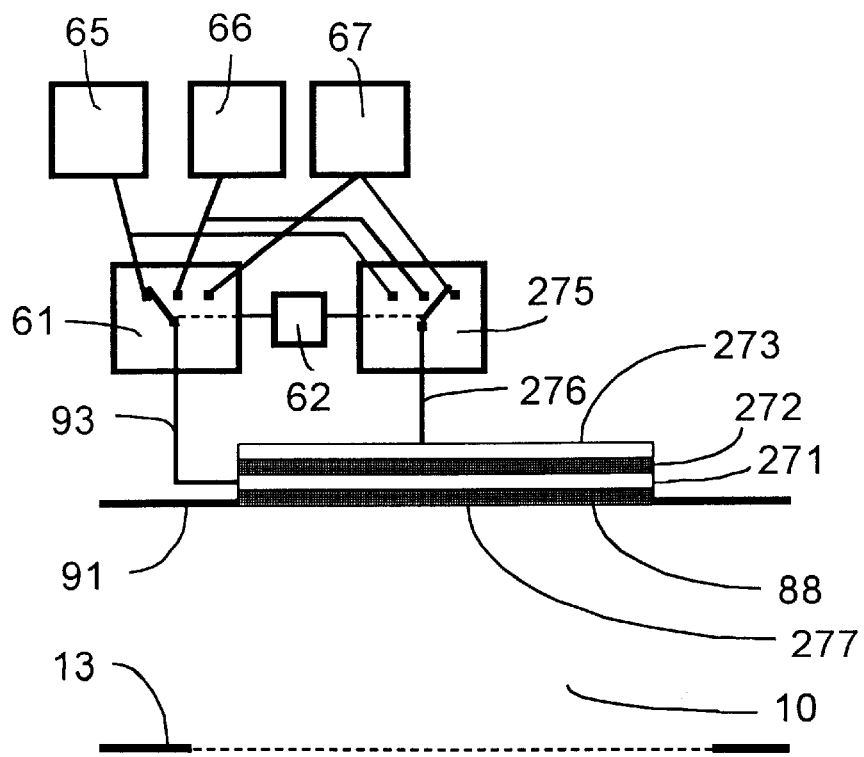
FIG. 5B is a side view diagram of a multilayer dielectric collecting surface with power supplies, switches and control electronics.

One embodiment of the invention is shown in FIG. 4 where collecting surface 88 or the conductor backing collecting surface is electrically isolated from electrode 91 as is diagrammed in FIG. 5A and 5B. Voltages provided by power supplies 65, 66 and 67 are selectively applied to collecting surface 88 or to conductor 271 backing collecting surface 88 through switch 61. The outputs of power supplies 65, 66 and 67 are connected to switch poles 77, 69 and 78 respectively. The voltage applied to switch output 93 connected to collecting surface 88, is controlled by controller 62 through switch control line 75. Voltages from power supplies 66 and 67, connected through lines 71 and 72 to poles 73 and 80 respectively of switch 70 are selectively applied to electrode 91 through output 98 of switch 70. The voltage applied to electrode 91 is controlled by switch controller 62 through control line 76. Switch 60 applies voltages from power supplies 63 and 64, connected to poles 68 and 79 respectively, to switch output 92 connected to exit lens 41. Switch controller 62 sets the output of switch 60 through control line 74 to control the gating or release of trapped ions from multipole ion guide 8. Voltages from power supplies 81 and 82, connected to poles 85 and 84 respectively of switch 83 are applied to lens 13 through switch 83 output connection 94. The voltage applied to lens 13 is controlled by switch controller 62 through control line 86. In the embodiment shown, lens 14 is tied to ground potential and voltage is applied to lens 42 from power supply 97. Steering lenses 15 and 16 are connected to power supplies 95 and 96 respectively. In the embodiment of the invention diagrammed in FIG. 4, the potentials of lenses 42, 14, 15 and 16 remain constant during an ion surface collecting and extraction cycle as diagrammed in FIG. 2.

Switches 60, 61, 70 and 83 are synchronously controlled by switch controller and timer 62. The pole positions of switches 60, 61, 70 and 83, as diagrammed in FIG. 4 are set to allow the gating or release of trapped ions from ion guide 8. The voltages set on power supplies 63, 97, 66, and 81 connected to electrodes or lenses 41, 42, 88 with 91 and 13 respectively, optimize the initial release of ion packet 51 from ion guide 8. After the gate ion release time period is over, controller 62 switches output 92 of switch 60 to power supply 64 through pole 79 to end the release of ions from ion guide 8. FIG. 2A illustrates the position of released ion packet 51 shortly after output 92 of switch 60 has been switched from power supply 63 to 64. Variations of trapping and releasing ions from ion guide 8 are described in U.S. Pat. No. 5,689,111 and these alternative means for ion trapping and release can be equally configured in the invention described herein. After an appropriate delay to allow the desired portion of ion packet 52 to move into position over collection surface 88 or 12 as shown in FIG. 2B, controller 62 switches output 93 from power supply 66 to 65 through switch 61. This switching of voltages changes the substantially neutral or zero electric field in pulsing region 10 to a reverse electric field that directs ions toward collecting surface 88. For positive ions, the voltage applied to power supply 65 will be less or more negative than the voltage applied to electrodes 91 and 13. The impact energy of ions with collecting surface 88 will be a function of the amplitude of the relative voltages applied to electrodes 13, 91 and 88 and the initial ion energy in the orthogonal direction prior to impacting on collecting surface 88. Higher impact energy may be applied to cause surface induced dissociation or a lower energy impact may be set to allow soft-landing of ions on collecting surface 88. As shown in FIG. 5A, collecting surface 88 may be configured as a subset of the total area of pulsing region electrode assembly 90.

During the reverse field or surface collecting step, the output of power supply 65 is applied directly to collecting surface 88 if collecting surface 88 is a conductive or a semiconductor material. If collecting surface 88 is comprises a dielectric material, voltage is applied to a conductor backing the dielectric surface. FIG. 5B is a side view dielectric collecting surface 88 backed by conductor 271. As diagrammed in FIGS. 5A and 5B, electrode 91 and collecting surface 88 of electrode assembly 90 are configured as a planar surface. Ion collecting surface 88 or conductor 271 backing collecting surface 88 is electrically isolated from electrode 91. The voltage applied to electrode 91 of electrode assembly 90 during the reverse field conditions can be set to be substantially equal to the voltage applied to lens of electrode 13. Alternatively, a voltage different from that applied to electrode 13 can be applied to electrode 91 that to optimize the ion collection or fragmentation conditions during the surface collection step. Due the electric field between collecting surface 88 and lens portion 91, ions are directed substantially toward collecting surface 88 during reverse field conditions. The size and position of collecting surface 88 is configured to maximize the detection efficiency of ions accelerated from surface 88 into TOF tube drift region 20. Ions that are initially spatially dispersed in Time-OF-Flight pulsing region 10 are spatially compressed on the surface area of collecting surface 88 prior to accelerating the ions into Time-Of-Flight tube drift region 20.

The initial velocity distribution of the ion beam traversing pulsing region can be reduced by collection on or near surface 88 prior to acceleration into time-of-flight drift region 20. Collecting surface 88 can be configured as a conveniently replaceable surface. Different surfaces may be interchanged to optimize performance for a desired analytical application. Surfaces may be comprised of conductor materials, bulk dielectric materials such as Teflon, Kapton, self assembled monolayer chemistries or piezo electric materials.

Referring to FIG. 4, output 93 is switched to power supply 65 for a desired time period. The collecting time period will vary depending on the field applied in pulsing region 10, the desired time for ions to spend in contact or in the vicinity of the surface and whether it is desired to collect all ions initially positioned in pulsing region or a portion of the ions on surface 88 prior to accelerating ions into Time-Of-Flight tube drift region 20. If collecting surface 88 is comprised of either a dielectric or a self assembled monolayer (SAM) material, the space charge created by ions initially collected on surface 88 may prevent additional ions from touching the surface under-soft landing conditions. Miller et. al., Science, Vol. 275, 1447, 1997, reported that an ion soft-landed on an F-SAM surface remains intact without loss of charge for hours when kept under vacuum. The retention of ion charge on the surface can be desirable in some analytical applications. The initial space charge created allows ions to be accelerated toward the collecting surface with compression of the initial ion packet spatial and velocity distribution while preventing ions from touching the surface prior to being accelerated into Time-Of-Flight tube drift region 20. Some degree of space charging maintained on the collecting surface facilitates removal or extraction of ions subsequently accelerated toward the surface because the space charge prevents the approaching ions from forming a bond with the surface. The collecting surface can be initially charged by conducting one or more initial surface collection cycles. Depending on the surface material used and the initial ions soft-landed, such soft-landed ions may not release with the reversal of the collecting electric field in pulsing region 10. In this manner an effective surface space charge steady state can be reached which enables very high ion yield from each subsequent soft landed surface collection cycle. Any small non-uniform field created by the space charge which would effect trajectories of ions traversing pulsing region 10 can be counteracted by applying the appropriate bias voltage to electrode 13 from power supply 81. Collecting and releasing ions from a dieletric surface with minimal space charge buildup can be achieved by controlling the complimentary image charge that plays a role in holding ions at a dielectric surface.

FIG. 5B is a diagram of one embodiment of the invention where electrode assembly 90 comprises a multiple layer collecting surface assembly. Dielectric collecting surface 88 is backed by conductive layer 271, dielectric layer 272 and conductive layer 273. Soft-landed or SID fragment ions that remain in contact with pulsing region side 277 of collecting surface 88 form an image charge on the reverse side of dielectric collecting surface 88. The image charge is delivered through conductive layer 271. Take the case of positive ion operating mode where the potential applied to electrode 13 is more positive than the potential applied to electrode 271 so that positive ions are directed toward collecting surface 88 during the ion surface collecting step. For softlanding conditions consider the voltages applied to electrodes 13, 19 and 271 to be +8, +2 and 0 V respectively. During the ion collection step, the voltage applied to conductive layer 273 from power supply 67 is +450 V. With +450 V applied to one side of dielectric layer 272, a negative image charge is retained along conductive surface layer 271. Dielectric and conductive layers 88, 271, 272 and 273 form a two layer capacitor assembly. Just as a forward accelerating voltage is applied in pulsing region 10, switch 275 applies voltage (0 V) from power supply 65 to conductive layer 273 through connection 276. The +450 voltage from power supply 67 is applied to conductive layer 271 through switch 61 and to electrode 90 to accelerate the ions collected on or near collecting surface 88 through the grid of electrode 13. The timing of the voltage switching is controlled by controller 62. The rapid release of charge through conductive layer 271 is aided by the rapid charge shift in the capacitor formed by layers 271, 272 and 273. The rapid potential change of conductive layer 271 reduces the image charge helping to hold the positive ions on collecting surface 88. The rapid reduction of image charge coupled with a forward biased accelerating field aids in overcoming the attractive forces holding the ions to the collecting surface and moving the ions into pulsing region 10 in the gas phase. Voltage polarities given for the positive ion example would be reversed for negative ion operation.

Alternatively, if collecting surface 88 was comprised of a single dielectric layer the image charge for positive ion collection could be delivered to the reverse side of collecting surface 88 by exposure to an electron beam during the ion collection step. Rapid removal of a negative image charge can be achieved by impinging the back side of collecting surface 88 with positive ion beam such as Xe+ ions at the onset of the forward accelerating field in pulsing region 10. For negative ion collection the positive ion beam can supply the image charge and the electron beam can be used to rapidly neutralize the image charge on the back side of collecting surface 88 when the forward accelerating field is applied in pulsing region 88. Depending on the amount of charge collected on collecting surface 88, it may be desirable to neutralize the image charge with a small delay before applying the forward accelerating field. This timing delay helps to decouple the ion extraction from the forward ion accelerating step minimizing the effects of space charge on the ion TOF flight time. The sequence of ion surface collection, rapid image charge reduction and acceleration of ions into TOF tube drift region 20 can occur at a rate of over 20,000 times per second limited by the heaviest ion mass to charge flight time. Using higher TOF pulse rates, the space charge buildup on collecting surface 88 per pulse is minimized for typical ion beam flux densities delivered from API sources. Consequently, the affects of collecting surface space charge on TOF ion flight time can be reduced or effectively eliminated by maintaining sufficiently high TOF pulse rates.

Figure 6:
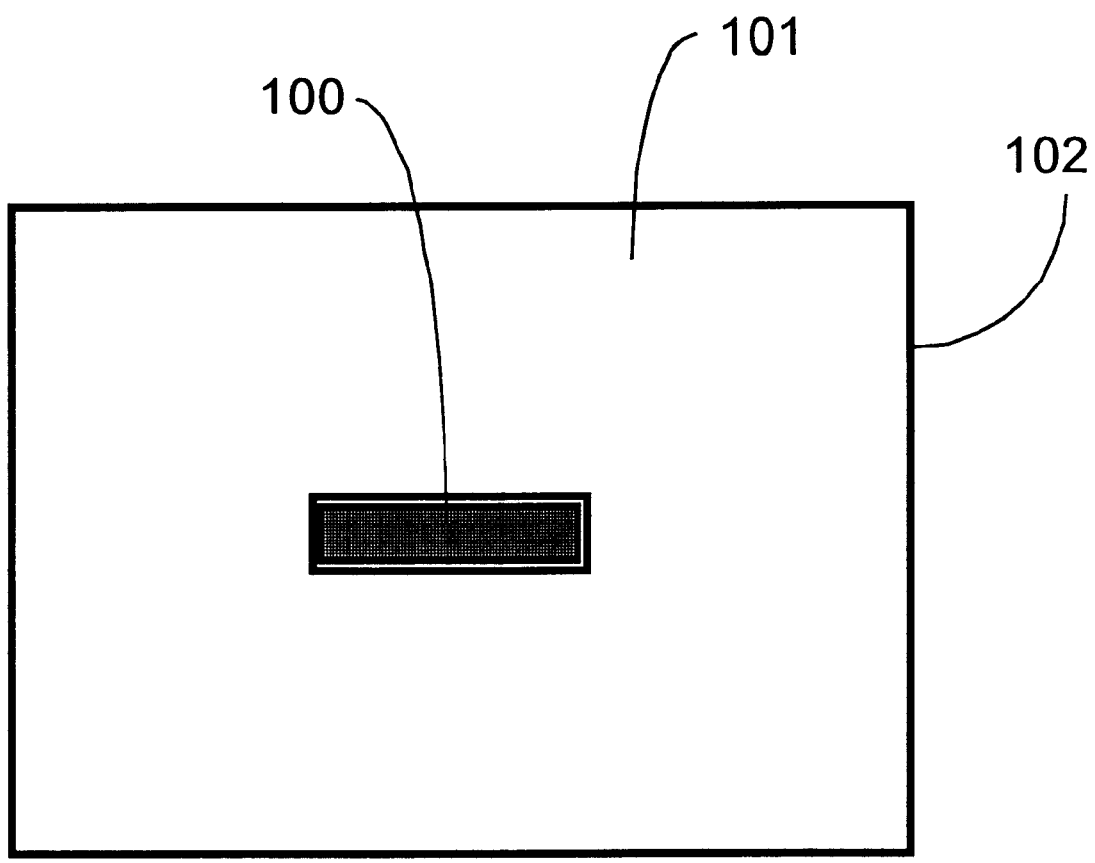
FIG. 6 is a diagram of an embodiment of a collecting surface of piezo electric material electrically insulated from a surrounding electrode.

In another embodiment of the invention as diagrammed in FIG. 6, electrode assembly 102 comprises electrode 101 and collecting surface 100. Electrode surface 100 is configured with piezo material. By application of an electric field across the piezo material or mechanically stressing the piezo material in the proper direction, the amount of charge maintained on collecting surface 100 can be controlled to prevent ions of like charge from touching collecting surface 100 during soft-landing operation. Any voltage applied across the piezo material of collecting surface 100 can be electrically referenced or floated on the output of switch 61. Voltage is applied to collecting surface 100 relative to the voltage applied to electrodes 101 and 13 to directs ions located in pulsing region 10 towards surface 100. The local charge present on surface 100 due to a stressed piezo ceramic state can prevent ions from touching the surface. Ions accelerated toward the charged collecting surface with sufficient velocity to overcome the local surface charge repulsion can impact the surface resulting in surface induced dissociation fragmentation. Local surface charge of the same polarity as approaching ions can result in reduced ion to surface charge exchange yielding a higher percentage of fragment ions. Piezo surface 100 may be configured from a number of materials and shapes including but not limited to a single material such a quartz or assemblies of materials such as PZT ceramic with layered conductors. For example, collecting surface 100 can be configured as a portion of one surface of a planar PZT bimorph where a conductive layer covers the bimorph surface accept for the area defined by collecting surface 100. In this manner a voltage can be applied across the bimorph assembly mechanically stress the crystal, resulting a surface charge on ceramic collecting surface 100. The surface polarity can be reversed by stressing the PZT bimorph in the opposite direction. Time-of-flight mass calibration can be performed after stressing the piezo material to account for any movement of collecting surface 100. Electrode 101 is electrically isolated from the piezo material to allowing the application of different voltages between collecting surface 100 and electrode 91. Relative voltages can be set between electrode 91 and collecting surface 100 to create a potential well that prevents surface collected ions from drifting or skating off the edges of collecting surface 100 prior to accelerating said ions into TOF tube drift region 20.

Space charge a the collecting surface can facilitate the release of SID fragment ions from the surface the electric field in the pulsing region is reversed. Depending on the SID ion fragmentation application, it may be desirable hold the reverse electric field for a given delay after all ions have initially impacted the collecting surface. This reverse field time delay after ion impact would stop or reverse the velocity of any parent or fragment ions reflected or scattered from the surface after SID. Winger et. al. reported that the average kinetic energy distributions of the product ions scattered from aklyl-monolayer surfaces after a 25 eV impact of the parent ions, ranged from 6 to 8 eV depending on the ion species and impact conditions. Delaying the application of the extraction or forward accelerating field would reduce the initial scattered product ion energy spread, improving time-of-flight resolution. The addition of a laser pulse directed onto collecting surface 88 after the reverse field is removed and the accelerating field is applied can also be used to promote ion release from collecting surface 88. The timing of the laser pulse and the application of the accelerating electric field reversal can be controlled to minimize the released ion spatial and energy spread resulting in higher time-of-flight resolution. The energy spread of ions released from the collecting surface with a laser pulse can be reduced by maintaining the reverse or surface collecting field for a short period of time prior to the application of the ion accelerating field in pulsing region 10.

A forward accelerating field is applied in pulsing region 10 after the reverse or collecting field has been held for a period of time. The accelerating field accelerates ions on or near collecting surface 88 into Time-Of-Flight tube drift region 20. As described above, the accelerating field may applied in conjunction with or after a laser pulse is directed onto collecting surface 88 to aid in the aid in the release of ions from collecting surface 88. Referring to FIG. 4, the rapid application of a forward accelerating field is achieved by simultaneously switching the output of power supply 67 to collecting surface 88 and electrode 91 through switches 61 and 70 respectively and the output of power supply 82 to electrode 13 through switch 83. The accelerating field accelerates ions on or near collecting surface 88 into Time-Of-Flight tube drift region 20. Switch 60 retains its state and the outputs of power supplies 97, 95 and 96 remain unchanged. The forward accelerating field applied in pulsing region 10, is maintained for a time period sufficient to allow the highest mass to charge of interest, to pass through the grid of ion lens 14 and into Time-Of-Flight tube drift region 20. After the applied forward acceleration field time period is complete, the controller simultaneously switches switch 83 from pole 84 to 83, switch 70 from pole 80 to 73, switch 61 from pole 78 to 69 and switch 60 from pole 79 to 68. This forms a substantially neutral field in pulsing region 10 and opens the gate to release ions from ion guide 8. This switch event begins a new ion gating, surface collection and TOF forward acceleration cycle. Controller 62, the power supplies and switches are configured to allow rapid rise time of the voltages applied to electrodes or lenses 41, 88, 91 and 13. The voltage rise time applied to electrodes 41, 88, 91 and 13 is generally less than 50 nanoseconds to achieve optimal Time-Of-Flight performance.

Variations to the ion surface collection and TOF pulsing cycle described can be configured by modifying the switching sequence and time delays as controlled by controller 62 to optimize performance for a given analytical application. For example, it may be desirable to configure more than one ion gating and surface collection cycle prior to accelerating ions into the time-of-flight drift region. Multiple gating and surface collection cycles may serve to accumulate ions on collecting surface 88 prior to extraction. Soft-landing surface collection cycles can be mixed with SID steps prior to ion extraction. The build up of surface space charge can be controlled in this manner or ion-surface reactions can be studied where the first packet of gated ions is accelerated to the collecting surface having a different composition than the ion packets that are surface collected from subsequent gated ion release cycles. Surface collected ions can retain their charge for a period of time when soft-landed on F-SAM or other dielectric surfaces allowing different ion populations supplied from pre-gated mass to charge selection or fragmentation steps to be sequentially collected or reacted on the collecting surface prior to extraction and acceleration into Time-Of-Flight tube drift region 20. In all configurations of the invention, ions with either positive or negative polarities can be directed toward collecting surface 88 or 100 with the appropriate polarity electric field applied in pulsing region 10. Similarly, the appropriate polarity electric field can be applied to extract positive or negative ions collected on or near collecting surface 88 or 100 and accelerate said ions into Time-Of-Flight tube drift region 20. Collecting surfaces 88 and 100 can be configured to be automatically replaced without breaking vacuum. With automated exchange from a set of collecting surfaces, a given collecting surface material can be rapidly configured to optimize performance for a given application. When the vacuum is vented, a single or a set of collecting surfaces can be removed and reinstalled manually by removal and reinstallation of vacuum flange assembly 49. Alternatively, collecting surface 88 can be configured as part of a continuous ribbon or belt. Collecting surface 88 can be refreshed by moving a portion of the belt through the collecting surface area. The belt can be moved periodically or continously to present a fresh surface at the location of collecting surface 88 during Time-Of-Flight operation. The belt can be configured with dielectric, conductive or semiconductive materials with or without SAM surface coatings.

Another embodiment of the invention is diagrammed in FIG. 3. Ions from a continuous beam enter pulsing region 110 from a substantially orthogonal direction while a reverse electric field is applied between electrode or lens 113 and electrode 111 and collecting surface 112. As shown in FIG. 3A, ions comprising continuous primary ion beam 150 enter pulsing region 110 from multipole ion guide 108 and are directed to collecting surface 112 in the presence of this reverse electric field. Ions are accumulated on or near collecting surface 112 for a period of time after which additional ions are prevented from entering pulsing region 110 as diagrammed in FIG. 3B. Continuous beam 150 can be stopped by applying a retarding or trapping potential to exit lens 141 which prevents ions traversing multipole ion guide 108 from exiting through exit lens 141. FIG. 3B illustrates the breaking of continuous beam 150 by applying a trapping potential to exit lens 141 and/or a combination of lens 141 and 142. The ions in truncated primary ion beam 152 continue into pulsing region 110 and are directed toward collecting surface 112. When the ions in pulsing region 110 have been collected on or near collecting surface 112, as represented by ion packet 153 in FIG. 3C, a forward accelerating electric field is applied between collecting surface 112 with electrode 111 and electrode 113. The forward accelerating electric field extracts ions in ion packet 153 from collecting surface 112 and released ion packet 154 is accelerated through the grids of electrodes of lenses 113 and 114 into Time-Of-Flight tube drift region 120 as diagrammed in FIG. 3D. Voltages can be applied to steering lenses 115 and 116 to steer the direction of the ions as ion packet 154 moves into Time-Of-Flight drift region 120. In the continuous beam embodiment of the invention as diagrammed in FIG. 3, ions are trapped or accumulated on collecting surface 112 with less time spent per cycle trapping ions in ion guide 108. High duty cycle can be achieved with this continuous beam embodiment of the invention because few ions are lost throughout the ion surface collection and extraction cycle. This is an alternative to the embodiment of the invention as diagrammed in FIG. 2, wherein more time is spent accumulating or trapping ions in ion guide 8 prior to collection on collecting surface 12. One embodiment or the other may yield optimal performance depending on the analytical application.

Electrode 145 may be added to pulsing region 110 as shown in FIG. 3 to provide a retarding potential to the primary ion beam. The kinetic energy, primarily in the axial direction, of ions in primary beam 150 as they enter pulsing region 110 is set by the voltage difference between the ion guide offset potential and the average field applied to electrodes 111 and 113 traversed by the primary ion beam. A voltage may be applied to electrode 145 to reduce the primary ion beam axial velocity as the ions traverse pulsing region 110. In soft landing surface collection operation it may be desirable to reduce the ion impact energy on the surface. The ion impact energy on the collecting surface is a function of the primary beam axial velocity component and the orthogonal component due the reverse collecting field applied in pulsing region 110. Configuring electrode 145 to retard the primary ion beam axial velocity component allows more precise control of the ion impact energy with collecting surface 112. Reducing the primary ion beam energy by lowering the potential of the ion guide offset relative to that of electrodes 111 and 113 reduces the ability to shape and direct the primary ion beam it enters pulsing region 110. Local fringing fields present in the path of the primary ion beam path prior to entering pulsing region 110 have a more pronounced and detrimental effect on focusing of the primary ion beam when the ion kinetic energy is reduced. Applying a retarding potential to electrode 145 during collection of ions on surface 112 allows the setting of the initial primary beam kinetic sufficiently high to achieve efficient transport from ion guide 108 into pulsing region 110. The potential applied to Electrode 145 provides an additional degree of control of the ion impact energy on surface 112 independent of the primary ion beam energy. When a forward accelerating potential is applied in pulsing region 110, the appropriate voltage is applied to electrode 145 to match the field that would appear at its position were it not present. With such a potential applied during ion acceleration into TOF tube drift region lens 145 does distort the optimal accelerating field established by potentials applied to electrode 111, surface 112 and electrode 113.

The power supply and voltage switching embodiment shown in FIG. 4 can be configured to control the continuous ion surface collection and extraction sequence diagrammed in FIG. 3. Replaceable collecting surface 112 and electrode 111 can be configured as diagrammed in FIG. 5 or 6 as described for the embodiment of the invention diagrammed in FIG. 2. In particular, surface space charge formed from ion accumulation on a dielectric or a Self Assembled Monolayer surface can be used to aid in ion extraction from the surface or to prevent soft landed ions from contacting the surface prior to acceleration into Time-Of-Flight tube 120. It is preferable to maintain the magnitude to the surface space charge at a reproducibly low level to minimize the effect of the space charge repelling force on an accelerated ion flight time. As was described for the embodiment diagrammed in FIG. 2, a laser pulse impinging on collecting surface 112 may also be used to aid in the release of ions collected on collecting surface 112. The timing of the laser pulse and the application of the forward ion accelerating field can be configured to provide optimal Time-Of-Flight mass analyzer performance.

An alternative embodiment of the invention is the configuration of collecting surface 88 in FIG. 5A coated with an appropriate matrix material, as is known in the art, to enable Matrix Assisted Laser Desorption Ionization (MALDI) of ions collected on collecting surface 88. Ions produced from an external ion source are collected on surface 88 as described above. A laser pulse with the optimal wavelength, power and duration is directed to impinge on collecting surface 88 to produce MALDI generated ions. The MALDI produced ions are then accelerated into the Time-Of-Flight tube with or without delayed extraction. If the external source is an Electrospray ionization source interfaced on-line to a liquid chromatography system, ions generated from the ES source are delivered to the collecting surface in the Time-of-Flight pulsing region. The ions may be softlanded or accelerated to the collecting surface with sufficient energy to cause surface induced dissociation fragmentation. The surface collected ion population may or may not be neutralized depending on the MALDI matrix material used. A laser pulse impinging on the collection surface releases ions and/or re-ionizes surface neutralized ions prior to acceleration of the product ions into the Time-Of-Flight tube drift region. Combining surface collection of API source generated ions with subsequent MALDI of said surface collected ions and surfaced neutralized molecules, allows MALDI mass spectra to be generated on line from LC or CE separations. A Time-Of-Flight mass analyzer can be configured according to the invention whereby ES and MALDI mass spectra can be alternatively generated on-line during an LC-MS or a CE-MS run. MALDI generated ions of higher molecular weight generally have fewer charges than ES generated ions from the same compounds. Depending on the configuration of the collection surface material multiply charged ions produced by ES ionization may have a reduction in the number of charges per ion on impact with the collecting surface. Charge reduction may be desirable in some applications as it spreads ion peaks out along the mass to charge scale, reducing peak complexity.

One aspect of the invention is configuration of heating or cooling of collecting surface 88 as diagrammed in FIG. 5A. Cooling of collecting surface 88 can aid in the condensing of more volatile ions on the surface prior to pulsing into the Time-Of-Flight tube drift region. A reduced surface temperature may also aid in slowing down chemical reactions at the surface or decrease the rate of ion charge exchange with the surface. Heating collecting surface 88 can aid in the release of ions from the collecting surface when a forward accelerating field is applied. Surface to ion reaction rates may be enhanced by heating the collecting surface in selected applications. Thermal fragmentation of ions can occur when ions land on a heated surface. Temperature cycling of the collecting surface during sample introduction to an API source can add a useful variable to surface reaction studies with subsequent Time-OF-Flight mass to charge analysis.

Figure 7A:
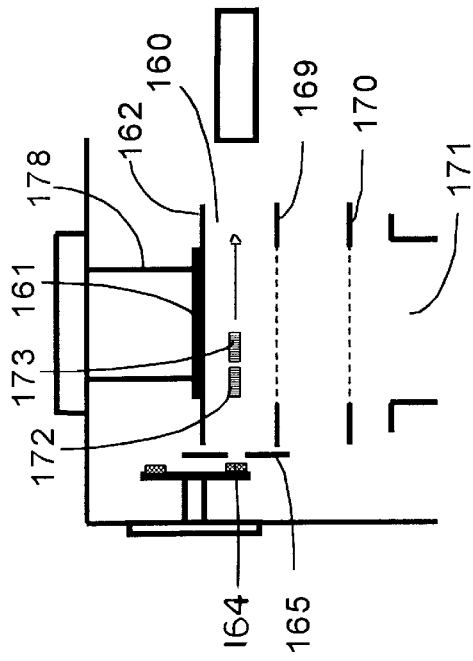
FIGS. 7A through 7D diagram one embodiment of the invention wherein, ions produced by Matrix Assisted Laser Desorption Ionization external to the pulsing region of a time-of-flight mass analyzer are collected on a surface in the pulsing region prior to accelerating the ions into the flight tube of a Time-Of-Flight mass analyzer.
Figure 7B:
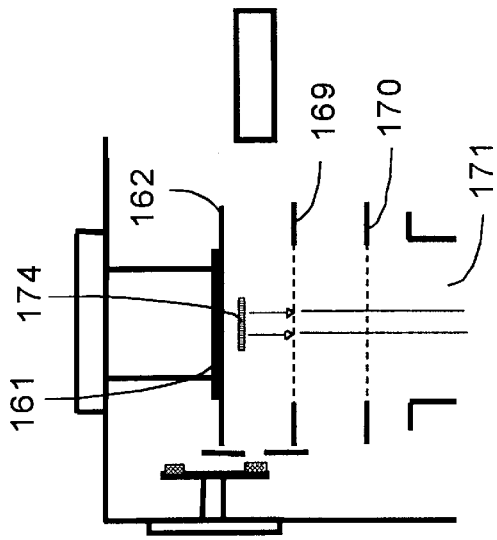
Figure 7C:
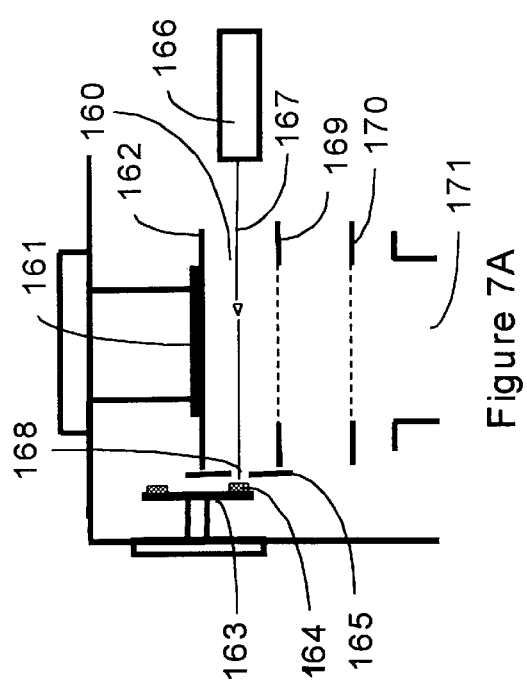
Figure 7D:
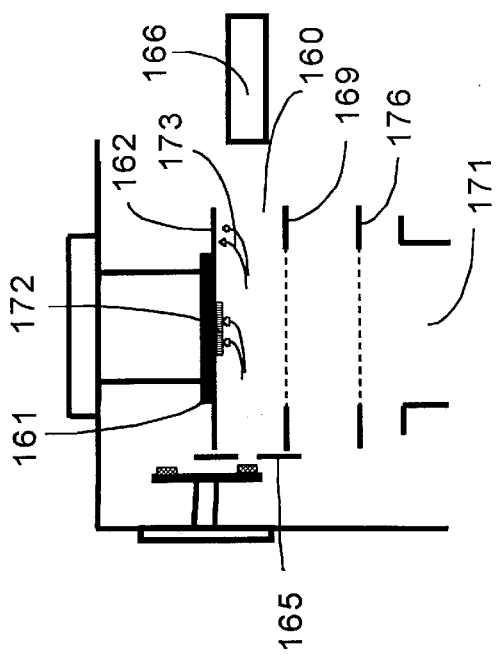

An alternative embodiment of the invention is diagrammed in FIGS. 7A through 7D. Referring to FIGS. 7A and 7B, ions produced in vacuum from an ion source located outside Time-Of-Flight pulsing region 160 are directed into pulsing region 160 and collected on collecting surface 161.

As an example of an ion source which produces ions in vacuum, FIG. 7 diagrams a Laser Desorption (LD) or Matrix Assisted Laser Desorption Ionization source mounted in the Time-Of-Flight vacuum region such that ions produced from a laser pulse are directed into Time-Of-Flight pulsing region 160. Removable multiple sample stage 163 positions sample 164 in line with laser pulse 167 generated from laser 166. In the embodiment shown, sample stage assembly 163 is configured whereby the position of sample 164 relative to laser pulse 167 can be adjusted to achieve maximum sample ion yield per laser pulse. Ions released from sample 164 due to an impinging laser pulse, are extracted with an extraction or accelerating potential applied between sample stage 163 and electrode or lens 165. Alternatively, delayed ion extraction from region 168, between electrode 165 and sample surface 164, can be achieved when a neutral field or a weak retarding field is applied for a period of time during and subsequent to the laser pulse hitting sample surface 164. After the delayed extraction time period, the ion extracting electric field is applied to region 168 between electrode 165 and sample stage 163 to accelerate ions from region 168 into pulsing region 160. Whether the ions are extracted from region 164 with a constant accelerating field or subsequent to a delayed extraction time period, the ions are accelerated into Time-Of-Flight pulsing region 160 with the ion packet primary velocity component oriented in a direction substantially parallel to the surface of lens or electrode 169. In the embodiment diagrammed in FIG. 7B, MALDI generated ions from sample 164 enter pulsing region 160 with trajectories generally orthogonal to the axis of Time-Of-Flight drift region 171.

A substantially neutral electric field is maintained in pulsing region 160 as the ions produced from laser pulse 167 traverse the pulsing region. The ions produced from laser pulse 167 and accelerated into pulsing region 160 are diagrammed as ion packets 172 and 173 in FIG. 7B. Ion packet 173 is comprised of the lower mass to charge ions, such as matrix related ions, created by laser pulse 167 impinging on sample 164. The lower mass to charge ions in ion packet 173 have a higher velocity component than the higher mass to charge ions comprising ion packet 172. Ions of different mass to charge experience some degree of Time-Of-Flight separation as they traverse pulsing region 160. After a selected time period subsequent to laser pulse 167, a reverse electric field is applied in Time-Of-Flight pulsing region 160 to direct the MALDI generated ions comprising ion packets 172 and 173 to move towards collecting surface 161 and electrode 162. The time delay prior to initiating surface collection can be chosen such that undesired lower mass to charge ions have time to move beyond pulsing region 160 when the reverse electric field is applied. As diagrammed in FIG. 7C, higher mass to charge ions from ion packet 172 are collected on collecting surface 161 while the lower mass to charge ions form ion packet 173 impact on electrode 162 and are not collected on collecting surface 161. When the reverse field has been applied for a time period sufficient to collect ions on or near collecting surface 161, a forward accelerating electric field is applied in pulsing region 160 between electrode 169 and collecting surface 161 and electrode 162. As shown in diagrammed in FIG. 7D, the forward ion accelerating field accelerates ions collected on or near collecting surface 161 into Time-Of-Flight drift tube region 171. A laser pulse can be applied to collecting surface 161 to aid in the release of ions from collecting surface 161.

The voltage switching sequence described for the MALDI ionization step, ion acceleration into pulsing region 160, surface collection of ions and subsequent acceleration of surface collected ions into Time-Of-Flight tube drift region 171, is similar to that described for the embodiment of the invention described in FIGS. 2 and 4. Individual power supply outputs can be applied to electrodes or lenses 163, 165, 162, collecting surface 161, and 169 through switches synchronized with a switch controller with timer. The assembly comprising collecting surface 161 and electrode 162 can be configured as diagrammed in FIG. 5 or 6 depending on the analytical application requirements. Ions can be accumulated on collecting surface 161 from one or more MALDI pulses prior to accelerating the surface collected ions into Time-Of-Flight drift region 171. Depending on the collecting surface material selected, surface space charge can be used to prevent incoming ions from touching the surface during soft landing surface collection, facilitating the subsequent ion extraction and acceleration into Time-Of-Flight tube drift region 171. Removable collecting surface 171 can be comprised of but not limited to conductive, insulating, Self Assembled Monolayer, semiconductor or piezo materials. Collecting surface holder assembly 178 can be configured to allow automatic changing of collecting surface 161 without breaking vacuum. Collecting surface materials can be switched to present the optimal collecting or fragmentation surface for a given application.

By adjusting the reverse electric field strength in pulsing region 160, MALDI produced ions can be directed to collecting surface 161 with energy sufficient to cause surface induced dissociation or soft landed with minimal fragmentation. Controlled SID ion fragmentation can be achieved for MALDI generated ions by selection of the relative voltage applied between electrode 169 and electrode 162 and collecting surface 161. MALDI generated ions moving from region 168 to surface 161 will spend sufficient time traversing pulsing region 160 to exhaust fast ion fragmentation processes that occur in MALDI ionization. Surface collection of MALDI generated ions reduces the chemical noise appearing in MALDI TOF mass spectra due to fast ion fragmentation processes that occur in MALDI ionization. With surface collection of MALDI generated ions, ion fragmentation processes are be completed prior accelerating the surface collected ions into Time-Of-Flight tube drift region 171. This results in higher resolution over a wider mass to charge range and easier to interpret mass spectra. All MALDI produced ions can be surface collected, if it is not desirable to eliminate ions in portions of the mass to charge scale. Lower mass to charge ions generated from the MALDI matrix may be eliminated using reverse field delayed extraction techniques in region 168 or with Time-Of-Flight separation in pulsing region 160 prior to surface collection as was described above. Analogous to the embodiment diagrammed in FIG. 3, MALDI produced ions can be continuously collected by the continuous application of a reverse and a retarding electric field in pulsing region 160 during the time period when MALDI produced ions are accelerated from region 168 into pulsing region 160. In this manner, all MALDI produced ions are collected on or near collecting surface 161 prior to being accelerated into Time-Of-Flight tube drift region 171.

Figure 8:
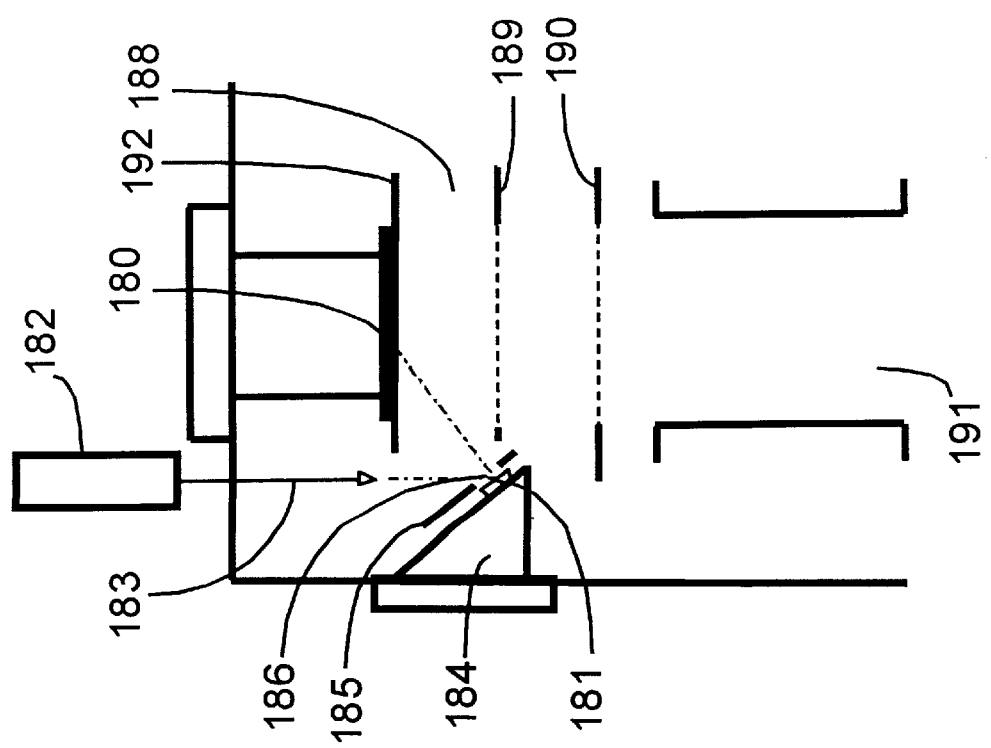
FIG. 8 is a diagram of one embodiment of the invention wherein, ions are produced from a position above the collecting surface of a Time-Of-Flight mass analyzer.

Any vacuum ion source can be substituted for the Laser Desorption or MALDI ion source diagrammed in FIG. 7 where ions enter pulsing region 160 with a trajectory substantially orthogonal to the Time-Of-Flight tube axis. Alternatively, ions produced from atmospheric pressure ion sources or vacuum ion sources can be configured such that the ions produced, need not be directed into time-of-flight pulsing region 10, 110 or 160 with a trajectory that is substantially orthogonal to the Time-Of-Flight tube axis. Alternative embodiments of the invention are diagrammed in FIGS. 8 and 9 wherein a MALDI ion source is configured such that the sample surface is positioned in front and behind collecting surfaces 180 and 212 respectively. Referring to FIG. 8, laser pulse 183 from laser 182 is directed onto sample 181 mounted on removable sample holder 184. Ions produced from laser pulse 182 are accelerated from region 186 into pulsing region 188 by applying the appropriate voltage, with or without delay extraction, to electrode 185. The MALDI generated ions pass through pulsing region 188 and are collected on replaceable collecting surface 180. Ions collected on or near collecting surface 180 are subsequently extracted from collecting surface 180 and accelerated into Time-Of-Flight tube drift region 191. Analogous to the continuous ion beam surface collection sequence diagrammed in FIG. 3, a reverse electric field is maintained between electrode 189 and collecting surface 180 and electrode 192 to direct ions accelerated from region 186 toward collecting surface 180. Ions produced from laser pulse 183 can be immediately accelerated into pulsing region 188 or the ions produced can be accelerated into pulsing region 188 after a delayed extraction period. Direct acceleration or delayed extraction from region 186 is controlled by the voltage applied to lens 185 relative to the voltage applied to electrically isolated sample holder 184 during and subsequent to the impinging of laser pulse 183 on sample 181. Ions collected on collecting surface 180 are extracted from collecting surface 180 and accelerated through lenses 189 and 190 into Time-Of-Flight tube drift region 191 by applying a forward accelerating field between electrodes 189 and collecting surface 180 and electrode 192 in Time-Of-Flight pulsing region 188. Multiple laser pulse and collecting steps may precede an ion accelerating pulsing into Time-Of-Flight tube drift region 191.

Figure 9:
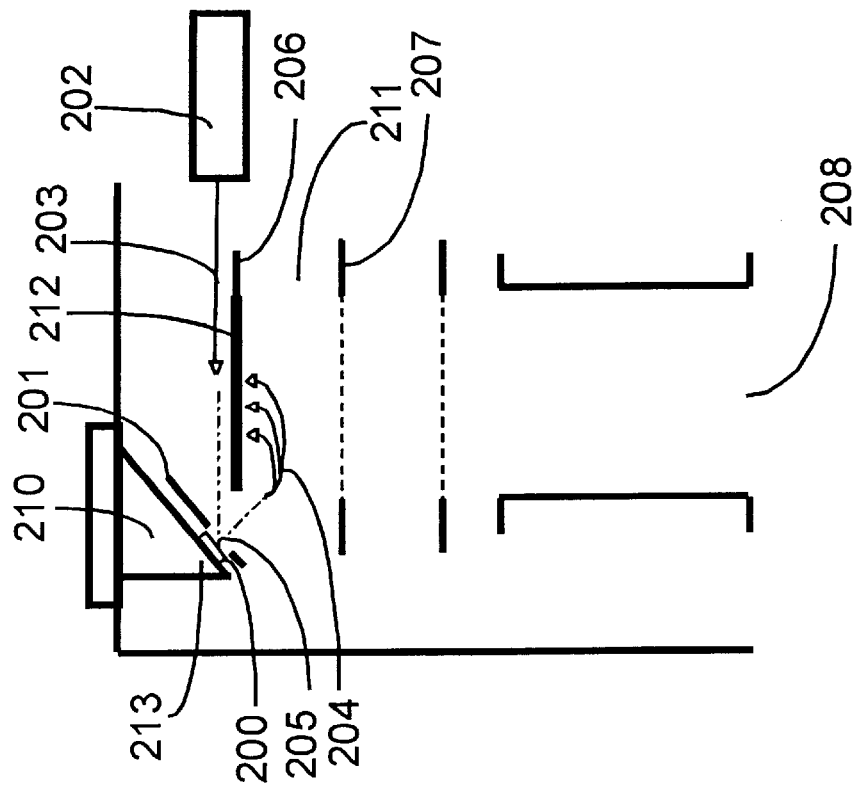
FIG. 9 is a diagram of one embodiment of the invention wherein, ions are produce from an initial position behind the collecting surface of a time-of-flight mass analyzer.

An alternative ion source mounting configuration is diagrammed in FIG. 9 wherein a MALDI ion source is positioned behind collecting surface 212. Laser pulse 203 produced from laser 202 impinges on sample 200 mounted on removable sample holder 210 releasing ions into region 205 above the sample surface. Ions located in region 205 are accelerated, with or without delayed extraction, into Time-Of-Flight pulsing region 211 by applying the appropriate voltages electrode 201 and sample holder 210. A reverse electric field is applied between electrode 207 and collecting surface 212 and electrode 206 in pulsing region 211 to direct ion trajectories toward collecting surface 212. Ions directed toward collecting surface 212 will form reversing curved trajectories 204 prior to approaching or impacting on collecting surface 212. In this embodiment of the invention, the relative positions and geometries of ion source 213 and Time-Of-Flight pulsing region 211 with collecting surface 212 can be configured in a manner that a spatial dispersion of ions can occur on collecting surface 212 based on the initial ion energy and trajectory. This ion surface position dispersion can be used to selectively eliminate a portion or portions of the initially produced ion population from being subsequently accelerated into Time-Of-Flight tube drift region 208. Depending on the size of collecting surface 212, ions of only a selected initial ion energy and trajectory will be collected prior to acceleration into Time-Of-Flight tube drift region 208. Initial ion energy can be selected by setting the appropriate electric fields in regions 205 and 211 during the surface collection period.

As diagrammed in FIG. 10, sample surface 216 can alternatively be positioned behind but parallel with collecting surface 215. Collecting surface 215 configured with an orifice positioned over sample 216 serves as the ion extracting electrode replacing electrode 201 in FIG. 9. In the embodiment diagrammed in FIG. 10 the laser is configured to direct laser pulse 217 up the TOF tube to impinge sample 216, producing MALDI generated ions. MALDI generated ions entering pulsing region 219 through orifice 214 in collecting surface 215 are reflected back to collecting surface 215 by applying a reverse electric field in pulsing region 219. Surface collected ions are subsequently accelerated into the Time-Of-Flight tube drift region by applying an accelerating field in pulsing region 219. In addition, a laser pulse can be applied to collecting surfaces 180, 212 or 215 to facilitate the release of ions from the collecting surfaces during the ion acceleration step.

Figure 11A:
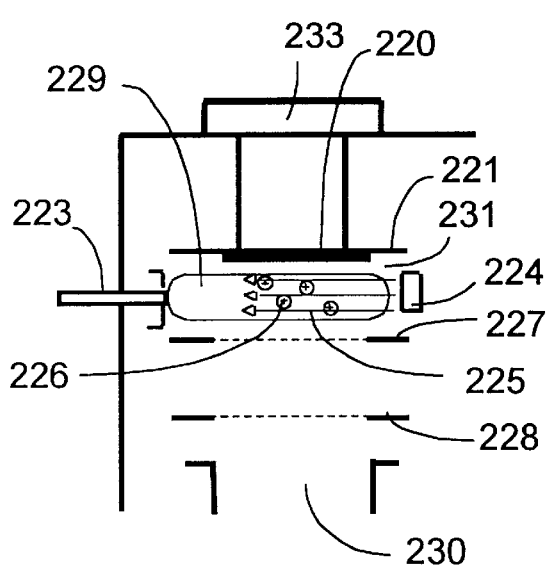
FIGS. 11A through 11D diagram one embodiment of the invention wherein ions produced by electron ionization in the pulsing region of a Time-Of-Flight mass analyzer are collected on a surface prior to acceleration into the flight tube of a Time-Of-Flight mass analyzer.

Another embodiment of the invention, as diagrammed in FIGS. 11A through 11D, is the configuration of a vacuum ion source that generates ions by Electron Ionization (EI) in Time Of-Flight pulsing region 231 with subsequent surface collection of the ions produced. Ions collected on or near collection surface 220 are then pulsed into Time-Of-Flight tube drift region 230 where they are mass to charge analyzed. Referring to FIG. 11A, sample bearing gas 229 is introduced into Time-Of-Flight pulsing region 231 through gas inlet tube 223. The neutral gas may be the output of a gas chromatography column that is introduced into the vacuum maintained in pulsing region 231. Pulsing region 231 and Time-Of-Flight tube drift region may be configured in different vacuum pumping stages in this embodiment of the invention to maintain the required vacuum pressures in Time-Of-Flight tube drift region 230 while allowing gas pressures greater than $10^{-5}$ torr in pulsing region 231. The pressure in pulsing region 231 can be decreased by configuring a pulsed gas inlet valve with gas pulsing synchronized with electron bombardment ionization, surface collection and Time-Of-Flight pulsing cycles. A continuous neutral gas source can be used if the pressure in pulsing region 231 is maintained sufficiently low to avoid ion to neutral collisions during ion acceleration from collecting surface 220 into Time-Of-Flight tube drift region 230.

Figure 11B:
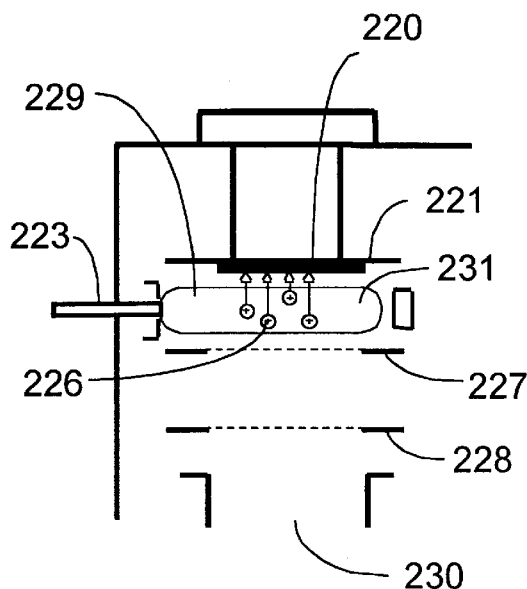
Figure 11C:
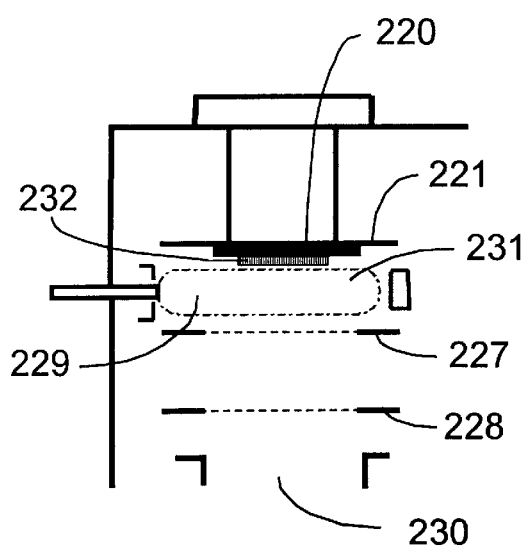
Figure 11D:
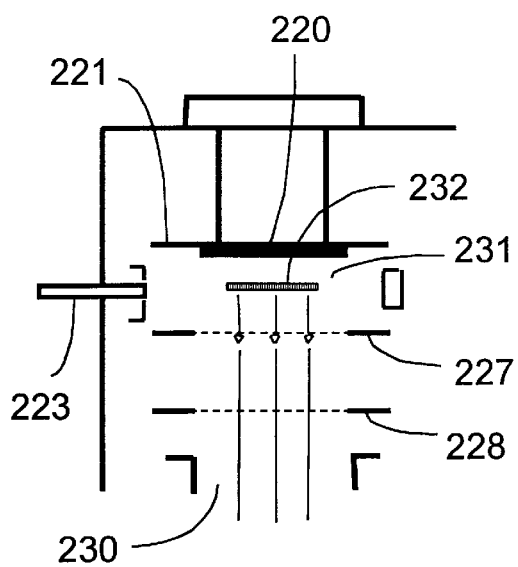

Sample bearing neutral gas from a continuous or pulsed gas source introduced into pulsing region 231 is ionized by electron beam 225, generated from filament and repeller assembly 224. Electron beam 225 is accelerated into pulsing region 231 when the electric field between electrode 227 and collecting surface 220 and electrode 221 is maintained substantially neutral. After a selected ionization time period, electron beam 225 is turned off and ions 226 formed in pulsing region 231 are directed toward collecting surface 220 by applying a reverse electric field between electrode 227 and collecting surface 220 and electrode 221. A pulsed gas source may be closed during the ion surface collection period. FIG. 11B, diagrams the acceleration of ions 226 towards collection surface 220 when a reverse electric field is applied in pulsing region 231. Ions can be accelerated toward collecting surface 220 with energy sufficient to cause surface induced dissociation by applying the appropriate reverse electric field in pulsing region 231. Alternatively, ions can be soft landed with lower reverse fields applied. Analogous to the apparatus and ion surface collecting methods described for FIGS. 2, 3, 4, 5 and 6, collecting surfaces may be comprised of but not limited to conductive, dielectric, semiconductor, multilayer, Self Assembled Monolayer or piezo electric materials. The collecting surface mounted to vacuum flange 233 is removable and can be configured as part of assemblies 90 and 102 as diagrammed in FIGS. 5 and 6 respectively. The voltages applied to electrodes 221, 227 and 228 and collecting surface 220 can be controlled by a power supply and switch configuration similar to that diagrammed in FIG. 4. The controller and timer may also be configured to switch the gas inlet pulsing valve that controls the flow of gas through gas inlet 223. When the EI source configured in FIG. 11 is operated such that a space charge occurs on collecting surface 220, soft landed ions can be moved close to collecting surface 220 without impacting. This method of operation facilitates the release of ions from collecting surface 220 when forward ion accelerating field is applied in pulsing region 231.

When operating with a gas pulsing valve, ions 232 can be held on or near the collecting surface for a period of time to allow a portion of the residual neutral gas in pulsing region 231 to pump away after the ion surface collection step. This increases the mean free path and minimizes ion to neutral collisions when the ions are accelerated from collecting surface 220 into the Time-Of-Flight tube drift region for mass to charge analysis. FIG. 4C diagrams the point in time just prior to applying the forward accelerating field in pulsing region 231. Neutral gas pressure 229 has been reduced during the surface collection time period. As diagrammed in FIG. 4D, a forward electric field is applied in pulsing region 231 accelerating ions from collecting surface 220 through the grids of electrodes 227 and 228 into Time-Of-Flight drift region 230. Subsequently, a neutral field is reapplied in pulsing region 231 and sample bearing gas is reintroduced into pulsing region 231 and ionized by Electron Ionization. Multiple EI ionization and surface collection steps can precede a forward ion acceleration step. Variations in the ionization, surface collection and acceleration sequence can be configured with the embodiment of the invention diagrammed in FIG. 11. For example, a laser pulse can be applied to collecting surface 220 to facilitate the release of ions 232 prior to or during the application of the forward accelerating field. If a space charge builds up on collecting surface 220 for positive ions, the electron beam can be briefly directed to impinge on collecting surface 220 during each cycle to neutralize desorbed ions. Conversely, for negative ions, electrons can be supplied to collecting surface to create space charge during each cycle. If reagent gas is introduced into pulsing region 231, sample gas can be ionized with chemical ionization in pulsing region 231. Photon or multiphoton ionization may also be used to produce ions in pulsing region 231. The embodiment of the invention as diagrammed in FIG. 11, improves Time-Of-Flight mass analysis resolution and mass accuracy when operating with an EI source. Ions created with a large spatial and energy spread in pulsing region 231, are collected on or near collecting surface 220, reducing the initial spatial and energy spread prior to ion acceleration into Time-Of-Flight tube drift region 230.

A wide range of ion sources can be configured with the inventions described herein. Multiple ion source can be configured in a TOF or hybrid TOF mass analyzer. For example, an EI source orthogonal pulsing API source and a MALDI source can be configured simultaneously in one TOF mass analyzer according to the invention. EI or Chemical ionization sources can be configured external the TOF pulsing region. The inventions can also be configured with a range of time-of-flight analyzer configurations that include ion reflectors, steering lenses and multiple detectors. A variety of vacuum system arrangements can be configured with the inventions as well. It is clear to one skilled in the art that variations in time-of-flight mass analyzers, control systems, collecting surface materials, pulsing region geometries, ion sources and hybrid mass analyzers can be configured that fall within the scope of the invention. The invention can also be configured with other mass analyzer types such as Fourier Transform mass spectrometer (FTMS) and three dimensional quadrupole ion trap mass spectrometers. The invention can be configured to reduce the ion energy spread of an ion packet or to cause SID fragmentation of ions prior to transferring the ions into the FTMS cell or an ion trap. Higher ion trapping efficiency can be achieved in FTMS and ion trap mass analyzers when the energy and spatial spread of the primary ion beam is reduced by surface collection of ions. SID fragmentation allows a higher fragmentation energy than can be achieved by in the gas phase by CD in either the FTMS cell or ion trap mass analyzer. Combining a SID with FTMS and ion trap mass analyzers extends their range analytical capability. More energetic means can also be configured to release ion collected on the collection surface such as sputtering with accelerated neutral or ion species directing a higher energy laser pulse onto the surface while a forward accelerating field is applied. These higher energy ion extraction means may cause ion fragmentation, damage the surface material or aid chemical reactions between the ion population and the surface material. In some cases inducing ion to surface compound reactions may be desirable. In hybrid mass analyzer configurations single or multiple steps of ion mass to charge selection, ion fragmentation or ion mobility separation can be conducted prior to directing the resulting ion population to the collecting surface in the pulsing region of a mass analyzer.

REFERENCES

The following references are referred to in the present application, the disclosures of which are hereby incorporated herein by reference:
1. McCormack et. al., Anal. Chem. 1993, 65, 2859–2872.
2. Miller et. al., Science, Vol. 275, 1447, 1997.
3. The Bendix Corporation Research Laboratories Division, Technical Documentary Report No. ASD-TDR-62-644, Part 1, April 1964
4. Wiley et. al., The Review of Scientific Instruments 26(12):1150–1157 (1955).
5. Winger et. al. Rev. Sci. Instrum., Vol 63, No. 12, 1992.
6. Wysocki et. al. J. Am. Soc. for Mass Spectrom, 1992, 3, 27–32.
7. Vestal et. al. in U.S. Pat. No. 5,625,184.
8. Dresch et. al. in U.S. Pat. No. 5,689,111.
9. Dresch in U.S. patent application Ser. No 60/021,184.

Having described this invention with regard to specific embodiments, it is to be understood that the description is not meant as a limitation since further modifications and variations may be apparent or may suggest themselves. It is intended that the present application cover all such modifications and variations, including those as fall within the scope of the appended claims.

What is claimed is:

1. A method of fragmenting ions whereby:

a. ions produced in an ion source are directed to a collecting surface configured in the pulsing region of a mass analyzer, forming an ion population or neutralized molecule population at said collecting surface, said collecting surface comprising a MALDI matrix material, said mass analyzer comprising a laser configured to direct laser pulses to said collecting surface, an analyzer region and a detector;

b. pulsing said laser to create MALDI generated ions from said ion or molecule populations; and c. accelerating said MALDI generated ions into said analyzer region of said mass analyzer for mass to charge analysis and detection.

* * * * *